US012526873B2

(12) United States Patent
Chin et al.

(10) Patent No.: US 12,526,873 B2
(45) Date of Patent: Jan. 13, 2026

(54) WIRELESS COMMUNICATION METHOD AND USER EQUIPMENT FOR PERFORMING TRANSMISSION IN RRC_INACTIVE STATE

(71) Applicant: SHARP KABUSHIKI KAISHA, Sakai (JP)

(72) Inventors: Heng-Li Chin, Taipei (TW); Hung-Chen Chen, Taipei (TW); Mei-Ju Shih, Taipei (TW); Yung-Lan Tseng, Taipei (TW); Hsin-Hsi Tsai, Taipei (TW); Chia-Hung Wei, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 533 days.

(21) Appl. No.: 17/918,650

(22) PCT Filed: Apr. 14, 2021

(86) PCT No.: PCT/CN2021/087207
§ 371 (c)(1),
(2) Date: Oct. 13, 2022

(87) PCT Pub. No.: WO2021/208957
PCT Pub. Date: Oct. 21, 2021

(65) Prior Publication Data
US 2023/0141487 A1     May 11, 2023

Related U.S. Application Data

(60) Provisional application No. 63/009,937, filed on Apr. 14, 2020.

(51) Int. Cl.
*H04W 76/27* (2018.01)
*H04W 76/30* (2018.01)

(52) U.S. Cl.
CPC .......... *H04W 76/27* (2018.02); *H04W 76/30* (2018.02)

(58) Field of Classification Search
CPC ............................. H04W 76/27; H04W 76/30
See application file for complete search history.

(56) References Cited

U.S. PATENT DOCUMENTS

| 2020/0053791 | A1  | 2/2020  | Ozturk et al. |
| 2021/0315049 | A1* | 10/2021 | Wei .................. H04W 76/27 |
| 2022/0015116 | A1  | 1/2022  | Chen et al. |

FOREIGN PATENT DOCUMENTS

| CN | 110876183 | 3/2020 |
| CN | 110971360 | 4/2020 |

(Continued)

OTHER PUBLICATIONS

ZTE Corporation (Email Discussion Moderator) : "Summary of small data enhancements for NR Rel-17—Phase 2", 3GPP Draft; RP-192574, 3GPP TSG-RAN Meeting #86, Sitges, Spain, Dec. 8-12, 2019 (Dec. 2, 2019).

(Continued)

*Primary Examiner* — Rhonda L Murphy
(74) *Attorney, Agent, or Firm* — ScienBiziP, P.C.

(57) ABSTRACT

A wireless communication method includes receiving, in an RRC_CONNECTED state, an RRC release message including first information and second information, the first information including at least one LCP restriction, the second information including one or more CG configurations; transitioning from the RRC_CONNECTED state to the RRC_INACTIVE state in response to the RRC release message; determining that data from an LCH corresponding to the at least one LCP restriction becomes available for UL transmission; determining whether to transmit the data in the RRC_INACTIVE state according to whether any of the one or more CG configurations meets the at least one LCP (Continued)

mapping restriction; and in a case that a CG configuration of the one or more CG configurations meets the at least one LCP mapping restriction, transmitting the data through a set of PUSCHs determined by the CG configuration of the one or more CG configurations.

12 Claims, 4 Drawing Sheets

(56) References Cited

FOREIGN PATENT DOCUMENTS

| WO | 2020033895 | 2/2020 |
|----|-----------|--------|
| WO | 2020067790 A1 | 4/2020 |
| WO | 2021197326 A1 | 10/2021 |

OTHER PUBLICATIONS

Huawei et al: "Further views on Rel-17 small data work area", 3GPP Draft; RP-191833, 3GPP TSG RAN Meeting #85, Newport Beach, US, Sep. 16-20, 2019 (Sep. 9, 2019).

ZTE Corporation, Sanechips, Discussion on RRC remaining issues, 3GPP TSG RAN WG2 Meeting #109bis electronic Electronic meeting, Apr. 20-Apr. 24, 2020, R2-2002564, sections 1-3.

LG Electronics Inc., UL data transmission in RRC_INACTIVE, 3GPP TSG-RAN WG2 Meeting #96, Reno, USA, Nov. 14-Nov. 18, 2016, R2-168280, the whole document.

3rd Generation Partnership Project; Technical Specification Group Radio Access Network; NR; Medium Access Control (MAC) protocol specification (Release 16), 3GPP TS 38.321 V16.0.0 (Mar. 2020).

\* cited by examiner

WIRELESS COMMUNICATION METHOD AND USER EQUIPMENT FOR PERFORMING TRANSMISSION IN RRC_INACTIVE STATE

CROSS-REFERENCE TO RELATED APPLICATION(S)

The present application is the National Stage of International Patent Application Serial No. PCT/CN2021/087207, filed on Apr. 14, 2021, which claims the benefit of and priority to U.S. Provisional Patent Application Ser. No. 63/009,937, filed on Apr. 14, 2020. The contents of all of the above-mentioned applications are hereby fully incorporated herein by reference for all purposes.

FIELD

The present disclosure generally relates to wireless communication, and more particularly, to a wireless communication method and user equipment (UE) for performing transmissions in a Radio Resource Control (RRC) INACTIVE state.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to wireless communication methods and UEs for performing transmissions in an RRC_INACTIVE state.

According to a first aspect of the present disclosure, a wireless communication method performed by a UE for performing transmissions in an RRC_INACTIVE state is provided. The wireless communication method includes: receiving, in an RRC_CONNECTED state, an RRC release message including first information and second information, the first information associated with a Logical Channel (LCH) configuration, the second information including a plurality of Configured Grant (CG) configurations; transitioning from the RRC_CONNECTED state to the RRC_INACTIVE state in response to the RRC release message; determining, after transitioning to the RRC_INACTIVE state, that data from an LCH corresponding to the LCH configuration becomes available for UL transmission; determining whether to transmit the data in the RRC_INACTIVE state according to whether any of the plurality of CG configurations is associated with the LCH configuration; and in a case that at least one of the plurality of CG configurations is associated with the LCH configuration, transmitting the data through a set of Physical Uplink Shared Channels (PUSCHs) determined by the at least one of the plurality of CG configurations.

According to a second aspect of the present disclosure, a UE for performing transmissions in an RRC_INACTIVE state is provided. The UE includes a receiver, a processor coupled to the receiver, and a memory coupled to the processor. The receiver is configured to receive, in an RRC_CONNECTED state, an RRC release message including first information and second information. The first information is associated with an LCH configuration. The second information includes a plurality of CG configurations. The memory stores at least one computer-executable program that, when executed by the processor, causes the UE to: transition from the RRC_CONNECTED state to the RRC_INACTIVE state in response to the RRC release message; determine, after transitioning to the RRC_INACTIVE state, that data from an LCH corresponding to the LCH configuration becomes available for UL transmission; determine whether to transmit the data in the RRC_INACTIVE state according to whether any of the plurality of CG configurations is associated with the LCH configuration; and in a case that at least one of the plurality of CG configurations is associated with the LCH configuration, transmit the data through a set of PUSCHs determined by the at least one of the plurality of CG configurations.

According to a third aspect of the present disclosure, a wireless communication method performed by a User Equipment (UE) for performing transmissions in a Radio Resource Control (RRC)_INACTIVE state is provided. The wireless communication method includes: receiving, in an RRC_CONNECTED state, an RRC release message including first information and second information, the first information including at least one Logical Channel Prioritization (LCP) restriction, and the second information including one or more Configured Grant (CG) configurations; transitioning from the RRC_CONNECTED state to the RRC_INACTIVE state in response to receiving the RRC release message; determining, after transitioning to the RRC_INACTIVE state, that data from a Logical Channel (LCH) corresponding to the at least one LCP restriction becomes available for Uplink (UL) transmission; determining whether to transmit the data in the RRC_INACTIVE state according to whether any of the one or more CG configurations meets the at least one LCP mapping restriction; and in a case that a CG configuration of the one or more CG configurations meets the at least one LCP mapping restriction, transmitting the data through a set of Physical Uplink Shared Channels (PUSCHs) determined by the CG configuration of the one or more CG configurations.

In some implementations of the third aspect of the present disclosure, the wireless communication method further includes: in a case that none of the one or more CG configurations meets the at least one LCP mapping restriction, prohibiting the UE from transmitting the data using the one or more CG configurations in the RRC_INACTIVE state.

In some implementations of the third aspect of the present disclosure, the wireless communication method further includes: releasing, after transitioning to the RRC_INACTIVE state, the at least one LCP restriction and at least part of the one or more CG configurations in a case that the UE determines that UL transmission is no longer needed to be performed in the RRC_INACTIVE state, the UE has moved outside of a coverage area of a serving cell, the UE is not synchronized with the serving cell, or the UE receives a release indicator in system information from the serving cell.

In some implementations of the third aspect of the present disclosure, the wireless communication method further includes: releasing, after transitioning to the RRC_INACTIVE state, all of the at least one LCP restriction and all of the one or more CG configurations in a case that the UE has moved outside of a coverage area of a serving cell.

In some implementations of the third aspect of the present disclosure, the wireless communication method further includes: releasing, after transitioning to the RRC_INACTIVE state, all of the at least one LCP restriction and all of the one or more CG configurations in a case that the UE is not synchronized with a serving cell.

In some implementations of the third aspect of the present disclosure, the wireless communication method further includes: releasing, after transitioning to the RRC_INACTIVE state, all of the one or more CG configurations in a case that the UE receives a release indicator in system information from a serving cell.

In some implementations of the third aspect of the present disclosure, the first information includes at least one of an allowed CG list that at least indicates the CG configuration of the one or more CG configurations; or a parameter denoted as configuredGrantTypeIAllowed.

According to a fourth aspect of the present disclosure, a User Equipment (UE) for performing transmissions in a Radio Resource Control (RRC)_INACTIVE state is provided. The UE includes a receiver, a transmitter, at least one processor coupled to the receiver and the transmitter, and at least one memory coupled to the at least one processor. The at least one memory stores at least one computer-executable program that, when executed by the at least one processor, causes the UE to: receive, in an RRC_CONNECTED state, by the receiver, an RRC release message including first information and second information. The first information includes at least one Logical Channel Prioritization (LCP) restriction, and the second information includes one or more Configured Grant (CG) configurations; transition from the RRC_CONNECTED state to the RRC_INACTIVE state in response to receiving the RRC release message; determine, after transitioning to the RRC_INACTIVE state, that data from a Logical Channel (LCH) corresponding to the at least one LCP restriction becomes available for Uplink (UL) transmission; determine whether to transmit the data in the RRC_INACTIVE state according to whether any of the one or more CG configurations meets the at least one LCP mapping restriction; and in a case that a CG configuration of the one or more CG configurations meets the at least one LCP mapping restriction, transmit, by the transmitter, the data through a set of Physical Uplink Shared Channels (PUSCHs) determined by the CG configuration of the one or more CG configurations.

In some implementations of the fourth aspect of the present disclosure, the at least one computer-executable program, when executed by the processor, further causes the UE to: in a case that none of the one or more CG configurations meets the at least one LCP mapping restriction, prohibit the UE from transmitting the data using the one or more CG configurations in the RRC_INACTIVE state.

In some implementations of the fourth aspect of the present disclosure, the at least one computer-executable program, when executed by the processor, further causes the UE to: release, after transitioning to the RRC_INACTIVE state, the at least one LCP restriction and at least part of the one or more CG configurations in a case that the UE determines that UL transmission is no longer needed to be performed in the RRC_INACTIVE state, the UE has moved outside of a coverage area of a serving cell, the UE is not synchronized with the serving cell, or the UE receives a release indicator in system information from the serving cell.

In some implementations of the fourth aspect of the present disclosure, the at least one computer-executable program, when executed by the processor, further causes the UE to: release, after transitioning to the RRC_INACTIVE state, all of the at least one LCP restriction and all of the one or more CG configurations in a case that the UE has moved outside of a coverage area of a serving cell.

In some implementations of the fourth aspect of the present disclosure, the at least one computer-executable program, when executed by the processor, further causes the UE to: release, after transitioning to the RRC_INACTIVE state, all of the at least one LCP restriction and all of the one or more CG configurations in a case that the UE is not synchronized with a serving cell.

In some implementations of the fourth aspect of the present disclosure, when the at least one computer-executable program is executed by the processor, the at least one computer-executable program further causes the UE to: release, after transitioning to the RRC_INACTIVE state, all of the one or more CG configurations in a case that the UE receives a release indicator in system information from a serving cell.

In some implementations of the fourth aspect of the present disclosure, the first information includes at least one of an allowed CG list that at least indicates the CG configuration of the one or more CG configurations; or a parameter denoted as configuredGrantTypeIAllowed.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
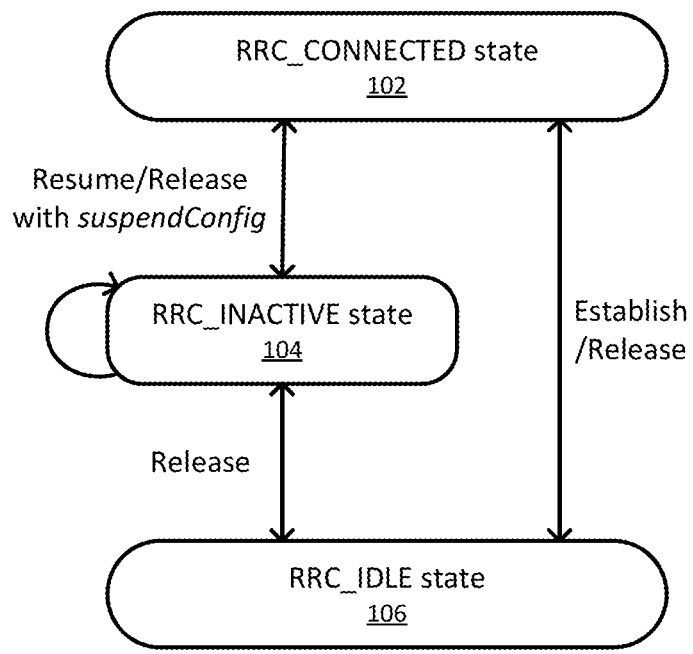
FIG. 1 illustrates a procedure of UE RRC state transitions in NR.

The acronyms mentioned in the present disclosure are defined as follows. Unless otherwise specified, the terms in the present disclosure have the following meanings.

| Abbreviation | Full name |
| --- | --- |
| 3GPP | 3rd Generation Partnership Project |
| 5G | 5th generation |
| 5G-S-TMSI | 5G-S-Temporary Mobile Subscriber Identity |
| ARQ | Automatic Repeat Request |

-continued

| Abbreviation | Full name |
| --- | --- |
| AS | Access Stratum |
| BS | Base Station |
| BSR | Buffer Status Report |
| BW | Band Width |
| BWP | Band Width Part |
| CA | Carrier Aggregation |
| CC | Component Carriers |
| CCCH | Common Control CHannel |
| CE | Control Element |
| CG | Configured Grant |
| CN | Core Network |
| C-RNTI | Cell-Radio Network Temporary Identifier |
| DCI | Downlink Control Information |
| DL | Downlink |
| DRB | Data Radio Bearer |
| DRX | Discontinuous Reception |
| E-UTRA | Evolved Universal Terrestrial Radio Access |
| HARQ | Hybrid Automatic Repeat Request |
| IE | Information Element |
| I-RNTI | Inactive Radio Network Temporary Identifier |
| L1 | Layer 1 |
| LCH | Logical Channel |
| LCP | Logical Channel Prioritization |
| LTE | Long Term Evolution |
| MAC | Medium Access Control |
| MCG | Master Cell Group |
| MCS | Modulation and Coding Scheme |
| NAS | Non-Access Stratum |
| NDI | New Data Indicator |
| NR | New RAT/Radio |
| NW | Network |
| PBCH | Physical Broadcast Channel |
| PCell | Primary Cell |
| PDCCH | Physical Downlink Control Channel |
| PDCP | Packet Data Convergence Protocol |
| PDU | Protocol Data Unit |
| PHY | Physical Layer |
| P-RNTI | Paging Radio Network Temporary Identifier |
| PSCell | Primary SCell |
| PTAG | Primary Timing Advance Group |
| PUCCH | Physical Uplink Control Channel |
| PUSCH | Physical Uplink Shared Channel |
| RA | Random Access |
| RAN | Radio Access Network |
| Rel- | Release |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RSRP | Reference Signal Received Power |
| SCell | Secondary Cell |
| SCG | Secondary Cell Group |
| SDU | Service Data Unit |
| SFN | System Frame Number |
| SI | System Information |
| SIB | System Information Block |
| SLIV | Start and Length Indicator |
| SR | Scheduling Request |
| SRB | Signaling Radio Bearer |
| SSB | Synchronization Signal Block |
| STAG | Secondary Timing Advance Group |
| S-TMSI | System Architecture Evolution Temporary Mobile Subscriber Identity |
| SpCell | Special Cell |
| TA | Timing Advance |
| TAG | Timing Advance Group |
| TAU | Tracking Area Update |
| TBS | Transport Block Size |
| TR | Technical Report |
| TRP | Transmission/Reception Point |
| TS | Technical Specification |
| UE | User Equipment |
| UL | Uplink |
| UL-SCH | Uplink Shared Channel |
| UTC | Coordinated Universal Time |

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in one implementation," or "in some implementations," may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the disclosed combination, group, series, or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details, such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software, or a combination of software and hardware. Disclosed functions may correspond to modules which may be software, hardware, firmware, or any combination thereof.

A software implementation may include computer-executable instructions stored on a computer-readable medium, such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Application-Specific Integrated Circuitry (ASIC), programmable logic arrays, and/or one or more Digital Signal Processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LIE-Advanced (LTE-A) system, an LTE-Advanced Pro system, or a 5G NR Radio Access Network (RAN) may typically include at least one base station (BS), at least one UE, and one or more optional network elements that provide connection within a network. The UE may communicate with the network such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UNITS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UNITS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, and/or LTE/NR Vehicle-to-Everything (V2X) services. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. An MCG may refer to a group of serving cells associated with the Master Node (MN), including the SpCell and optionally one or more SCells. An SCG may refer to a group of serving cells associated with the Secondary Node (SN), including the SpCell and optionally one or more SCells.

As disclosed previously, the frame structure for NR supports flexible configurations for accommodating various next-generation (e.g., 5G) communication requirements such as eMBB, mMTC, and URLLC, while fulfilling high reliability, high data rate, and low latency requirements. The Orthogonal Frequency-Division Multiplexing (OFDM) technology in the 3GPP may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and a UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

A UE is either in RRC_CONNECTED state or in RRC_INACTIVE state when an RRC connection has been established. If this is not the case, e.g., no RRC connection is established, the UE is in RRC_IDLE state.

In RRC_IDLE state, a UE may be configured with a UE-specific DRX, and/or UE-controlled mobility may be configured based on the network configuration. A UE may perform one or more of the following actions in RRC_IDLE state:

monitoring Short Messages transmitted with P-RNTI over DCI,
monitoring a Paging channel for CN paging using (5G-)S-TMSI,
performing neighboring cell measurements and cell (re-)selection, and
acquiring system information and sending SI request (if configured).

In RRC_INACTIVE state, the UE may be configured with a UE-specific DRX, UE-controlled mobility may be configured based on the network configuration, the UE may store the UE Inactive AS context, and/or an RNA may be configured by the RRC layer. A UE may perform one or more of the following actions in RRC_INACTIVE state:

monitoring Short Messages transmitted with P-RNTI over DCI,
monitoring a Paging channel for CN paging using (5G-)S-TMSI and RAN paging using full I-RNTI, performing neighboring cell measurements and cell (re-) selection, performing RNA updates periodically and when moving outside the configured RAN-based notification area, and acquiring system information and sending SI request (if configured).

In RRC_CONNECTED state, a UE may store the AS context and/or transfer unicast data to/from another UE. Moreover, a UE in RRC_CONNECTED state may be configured with a UE-specific DRX. For UEs (in RRC_CONNECTED state) supporting CA, one or more SCells, aggregated with the SpCell, may be used for increasing the BW. For UEs (in RRC_CONNECTED state) supporting DC, one SCG, aggregated with the MCG, may be used for increasing the BW. In RRC_CONNECTED state, network-controlled mobility within NR and to/from E-UTRA may be supported, including handover between NR cells and perform handover from an NR/E-UTRA cell to a E-UTRA/NR cell.

A UE may perform one or more of the following actions in RRC_CONNECTED state:

monitoring Short Messages transmitted with P-RNTI over DCI (if configured), monitoring control channels associated with the shared data channel to determine if data is scheduled for it, providing channel quality and feedback information, performing neighboring cell measurements and measurement reporting, and acquiring SI.

In other words, a UE in NR may operate in only one RRC state at one time.

illustrates a procedure of UE RRC state transitions in NR. A UE may have only one RRC state in NR at one time. In other words, a UE in NR may operate in only one RRC state at one time.

The network may initiate an RRC connection release procedure by sending a RRC Release message (with a suspend configuration) to a UE. The suspend configuration may refer to a parameter/IE denoted as "suspendConfig" which provides information to a UE for RNA update, paging cycle, etc. For example, the suspendConfig IE may include (but is not limited to) one or more of the following IEs (fullI-RNTI/shortI-RNTI, ran-PagingCycle, ran-NotificationAreaInfo, t380):

fullI-RNTI/shortI-RNTI: Used to identify the suspended UE context of a UE in RRC_INACTIVE state.

ran-PagingCycle: Refers to the UE specific cycle for RAN-initiated paging. Value rf32 corresponds to 32 radio frames, value rf64 corresponds to 64 radio frames, and so on.

ran-NotificationAreaInfo: Network ensures that the UE in RRC_INACTIVE state always has a valid ran-NotificationAreaInfo.

t380: Refers to the timer that triggers the periodic RNAU procedure in UE. Value min5 corresponds to 5 minutes, value min10 corresponds to 10 minutes, and so on.

An RRC connection release procedure may be initiated for transitioning a UE in RRC_CONNECTED state 102 to RRC_IDLE state 106, transitioning a UE in RRC_CONNECTED state 102 to RRC_INACTIVE state 104 (only if SRB2 and at least one DRB is setup in RRC_CONNECTED state), keeping a UE in RRC_INACTIVE state 104 when the UE tries to resume, or transitioning a UE in RRC_INACTIVE state 104 to RRC_IDLE state 106 when the UE tries to resume.

The network may send an RRC release message without suspendConfig to transition a UE from RRC_CONNECTED state 102/RRC_INACTIVE state 104 to RRC_IDLE state 106. The network may send an RRC release message with suspendConfig to transition a UE from RRC_CONNECTED state 102 to RRC_INACTIVE state 104 or keep the UE stay in RRC_INACTIVE state 104.

Upon reception of an RRC release message with suspendConfig from the network, the UE may perform one or more of the following actions (1) to (7):

(1) applying the received suspendConfig;
(2) resetting MAC (layer/entity) and release the default MAC Cell Group configuration, if any;
(3) re-establishing RLC entities for SRB1;
(4) suspending all SRB(s) and DRB(s), except for SRB0;
(5) indicating a PDCP suspend to the lower layer(s) (e.g., the RLC layer, the MAC layer, and/or the PHY layer) of all DRBs;
(6) indicating the suspension of the RRC connection to the upper layer(s) (e.g., the NAS layer); and
(7) entering RRC_INACTIVE state and performing cell (re)selection.

The network can dynamically allocate resources to UEs in RRC_CONNECTED state via the C-RNTI on PDCCH(s). A UE may always monitor the PDCCH(s) in order to find possible grants for UL transmission when its downlink reception is enabled (activity governed by DRX when configured). When CA is configured, the same C-RNTI applies to all serving cells.

The network can allocate UL resources for the initial transmissions to UEs in RRC_CONNECTED state via configured UL grant. A configured UL grant may be also referred to as a configured grant (CG). The term "configured UL grant" and the term "CG" may be utilized interchangeably in the present disclosure. The term "configured UL grant" may be also be referred to as a "CG configuration."

In general, there are two types of configured UL grants:

(1) CG Type 1, where a UL grant is provided by RRC, and stored as a configured UL grant; and
(2) CG Type 2, where a UL grant is provided by PDCCH, and stored or cleared as a configured UL grant based on L1 signaling indicating configured UL grant activation or deactivation.

CG Type 1 and CG Type 2 are configured by RRC per Serving Cell and per BWP. Multiple CG configurations can be active simultaneously on the same Serving Cells/BWP. The activation/deactivation of a CG of CG Type 2 may be independent among the Serving Cells/BWPs. For the same Serving Cell/BWP, the MAC entity may be configured with both CG Type 1 and CG Type 2.

The RRC (layer) of UE may be configured with one or more of the following parameters when the CG Type 1 is configured:

cs-RNTI: CS-RNTI for retransmission;
periodicity: periodicity of the CG Type 1;
timeDomainOffset: Offset of a resource with respect to SFN=0 in time domain;
timeDomainAllocation: Allocation of configured UL grant in time domain which contains startSymbolAndLength (e.g., SLIV); and
nrofHARQ-Processes: the number of HARQ processes for CG.

On the other hand, the RRC (layer) of the UE may be configured with at least one of the following parameters when the CG Type 2 is configured:

cs-RNTI: CS-RNTI for retransmission;
periodicity: periodicity of the CG Type 2; and
nrofHARQ-Processes: the number of HARQ processes for CG.

Upon configuration of a CG Type 1 for a Serving Cell by upper layers, the MAC entity of the UE may store the UL grant provided by the upper layers as a configured UL grant for the indicated Serving Cell, and/or initialise or re-initialise the configured UL grant to start in the symbol according to timeDomainOffset and S (derived from SLIV as specified in TS 38.214), and to reoccur with periodicity.

In NR Rel-15 and Rel-16, a UE needs to be in RRC_CONNECTED state in order to receive dynamic grants or be configured with a configured UL grant from the network for UL transmission. However, NR Rel-17 opens the possibility for a UE to perform UL transmission even when it is in RRC_INACTIVE state. As such, there may be no need to transition from RRC_INACTIVE state to RRC_CONNECTED state when a UE has UL data ready for transmission.

As illustrated in FIG. 1, the RRC state of a UE can be controlled by the network. The network may directly switch the UE from RRC_CONNECTED state 102 to RRC_INACTIVE state 104 via an RRC release message with suspendConfig. If the UE is in RRC_IDLE state 106 and is to be transitioned to RRC_INACTIVE state 104, the RRC state of the UE should be switched to RRC_CONNECTED state 102 first and then switched to RRC_INACTIVE state 104. The RRC state of the UE could not be switched to RRC_INACTIVE state 104 directly from RRC_IDLE state 106. Thus, the configuration(s) for a UE to perform UL transmission in RRC_INACTIVE state may be (re-)configured, by the network, while a UE is in RRC_CONNECTED state 102 or RRC_INACTIVE state 104. The network may (re-)configure one or multiple CG configurations that may be used by a UE for UL transmission while it is in RRC_INACTIVE state (e.g., the CG configuration(s) is only valid to a UE while it is in RRC_INACTIVE state 104). The network may (re-)configure (signal) one or multiple CG configurations that may be used by a UE for UL transmission in both RRC_CONNECTED state 102 and RRC_INACTIVE state 104 (e.g., the CG configuration(s) is valid to a UE in both RRC_CONNECTED state 102 and RRC_INACTIVE state 104).

NR Rel-17 opens the possibility for a UE to perform UL transmission even while it is in RRC_INACTIVE state. As such, no state transition from RRC_INACTIVE state to RRC_CONNECTED state may be required when a UE has UL data ready for transmission. However, how a UE indicates its interest/capability to perform UL transmission in RRC_INACTIVE state and how the network provides UL resources (e.g., PUSCH resources corresponding to CG configuration(s)) to a UE for UL transmission in RRC_INACTIVE remains unspecified.

From the network's perspective, proper configuration of UL resources (e.g., PUSCH resources corresponding to CG configuration(s)) for a UE to perform UL transmission in RRC_INACTIVE state may consider a UE's capability and/or a UE's interest to perform UL transmission in RRC_INACTIVE state. Specifically, this may take into account both the UE's capability signaling and the UE's service request signaling. On the other hand, before a UE sends a capability signaling and/or serving request signaling to the network, it may also be informed, by its serving network (e.g., gNB), whether configuration/provision of UL resources (e.g., PUSCH resources corresponding to CG configuration) for a UE to perform UL transmission in RRC_INACTIVE state is supported.

UL resources (e.g., PUSCH resources corresponding to (e.g., derived from) CG configurations) for a UE to perform UL transmission in RRC_INACTIVE state may be configured, by the network, while the UE is in either RRC_INACTIVE or RRC_CONNECTED state. A CG configuration for a UE to perform UL transmission in RRC_INACTIVE state may be (re-)configured via a suspend configuration in an RRC release message (or "RRCRelease message") when the network needs to transition a UE from RRC_CONNECTED state to RRC_INACTIVE state. The suspend configuration may be an IE (e.g., suspendConfig) that contains information needed by the UE to maintain its AS context during the RRC_INACTIVE state. A CG configuration for a UE to perform UL transmission in RRC_INACTIVE state may be (re-)configured, by the network, via dedicated RRC signaling (e.g., an RRC reconfiguration message) while the UE is in RRC_CONNECTED state. While the UE is in RRC_INACTIVE state, a CG configuration for a UE to perform UL transmission in RRC_INACTIVE state may be (re-)configured, by the network, via paging and/or (other) SI.

In order to support UL transmission in RRC_INACTIVE state, the DRB/SRB/LCH used for conveying UL data may need to be established/configured/setup and/or remain unsuspended while a UE is in RRC_INACTIVE state. This may require new DRB-/SRB-/LCH-related configuration(s) (e.g., LogicalChannelConfig, RLC-BearerConfig, SRB-Identity, DRB-Identity, LogicalChannelIdentity, radio-BearerConfig, etc.) specifically for a UE in RRC_INACTIVE state. Alternatively, some procedural changes may be done in order to prevent suspension of the DRB/SRB that has been set up while a UE is in RRC_CONNECTED state when the UE performs state transition from RRC_CONNECTED state to RRC_INACTIVE state.

Furthermore, for a UE in RRC_INACTIVE state, a mapping relationship may be defined between the configured LCH(s) and the UL resources (e.g., PUSCHs corresponding to CG configuration(s)) for UL transmission in RRC_INACTIVE state. For example, a UE supporting multiple traffic types may be configured, by the network, with UL resources with different characteristics (e.g., multiple CG configurations with different TBS, periodicity, starting offset, number of HARQ processes, MCS index, number of repetitions, MCS table, etc.) for UL transmission in RRC_INACTIVE state. Based on this assumption, LCP mapping restriction(s) for a UE in RRC_INACTIVE state may be required in order to map UL data from different LCH(s) to UL resources with different characteristics, e.g., map UL data from different LCH(s) to different CG configuration(s) in RRC_INACTIVE state.

Signaling of UE Capability

A UE may provide information regarding whether it is capable to support transmission via (multiple) configured UL grant(s) in RRC_INACTIVE state to the network. The information may be transmitted from the UE to the network in the form of UE radio access capability parameters. The network may respect the transmitted UE radio access capability parameters when configuring the UE and when scheduling the UE.

One or multiple of the UE radio access capability parameters may be transmitted from a UE to its serving network via (dedicated) RRC signaling. One or multiple of the UE radio access capability parameters may be transmitted from a UE to its serving network via a UE Assistance Information message (e.g., the UEAssistanceInformation message provided in 3GPP TS 38.331 V15.7.0). One or multiple of the UE radio access capability parameters may be transmitted from a UE to its serving network via a UE capability message (e.g., the UECapabilityInformation message provided in 3GPP TS 38.331 V15.7.0), e.g., after the UE receives a UE capability enquiry message (e.g., UECapabilityEnquiry message) from its serving network. One or multiple of the UE radio access capability parameters may be transmitted, from a UE to its serving network (e.g., eNB/gNB), only when (or after) the UE has indicated that it supports operation in RRC_INACTIVE state (e.g., the UE has indicated inactiveState-r15 to the network, where inactiveState-r15 is a parameter provided in 3GPP TS 36.306 V15.7.0). The parameter inactiveState-r15 may be indicated with one or multiple of the UE radio access capability parameters in the same message (e.g., via the same RRC signaling).

A UE radio access capability parameter may refer to one of the following:

- a UE radio access capability parameter to indicate the capability of supporting UL transmission in RRC_INACTIVE state;
- a UE radio access capability parameter to indicate the supported characteristics of the UL resource (e.g., multiple CG configurations with different TBS, periodicity, starting offset, number of HARQ processes, MCS, etc.);
- a UE radio access capability parameter to indicate the capability of supporting a CG configuration in RRC_INACTIVE state;
- a UE radio access capability parameter to indicate the capability of supporting multiple CG configurations in RRC_INACTIVE state;
- a UE radio access capability parameter to indicate the capability of supporting reporting of an RRC_INACTIVE configured UL grant service/modification request;
- a UE radio access capability parameter to indicate which SRB/DRB(s) could be used for transmission in RRC_INACTIVE state;
- a UE radio access capability parameter to indicate the capability of supporting selection of logical channels for each UL grant based on the RRC-configured restriction in RRC_INACTIVE state;
- a UE radio access capability parameter to indicate the capability of supporting skipping of UL transmission for a configured UL grant in RRC_INACTIVE state if no data is available for transmission as specified in 3GPP TS 38.321 V15.7.0;
- a UE radio access capability parameter to indicate the capability to support of BSR/SR reporting in RRC_INACTIVE state;
- a UE radio access capability parameter to indicate the capability of supporting an ARQ mechanism (e.g., to indicate if RCL AM mode is supported) in RRC_INACTIVE state; and
- a UE radio access capability parameter to indicate the capability of supporting HARQ feedback in RRC_INACTIVE state.

If one or multiple of the UE radio access capability parameters as shown above are transmitted from a UE to its serving network (e.g., via an UE Assistance Information message (e.g., the UEAssistanceInformation message provided in 3GPP TS 38.331 V15.7.0) or any other RRC signaling), a prohibit timer may then be configured to a UE in order to ensure the UE does not transmit such information to the network too frequently. While the prohibit timer is running, the UE may be prohibited from transmitting one or multiple of the radio access capability parameters described previously. In other words, the UE may only transmit one or multiple of the UE radio access capability parameters while the prohibit timer is not running. The prohibit timer may be (re)started upon transmission of one or multiple of the UE radio access capability parameters. On the other hand, the prohibit timer may be stopped upon the UE being requested to enter RRC_IDLE state (e.g., upon reception of a RRCRelease message without suspendConfig). The value of the prohibit timer may be configured, by the network, via dedicated RRC signaling. The prohibit timer may be in unit of symbols, slots, subframe, system frames, hyper frames, milliseconds, seconds, minutes, hours, or days thereof.

An initiation timer may be configured to a UE in order to control the reporting of one or multiple of the UE radio access capability parameters. The initiation timer may be started upon configuration or upon (the first) transmission of one or multiple of the UE radio access capability parameters. On the other hand, the initiation timer may be stopped upon the UE being requested to enter RRC_IDLE state (e.g., upon reception of a RRCRelease message without suspendConfig). When the initiation timer expires, one or multiple of the UE radio access capability parameters may be transmitted by the UE to the network.

Indication of Capability to Support CG Configuration for UEs in RRC_INACTIVE

The network may indicate capability information to its serving UE. The capability information may indicate whether the network supports (multiple) configured UL grant(s) in RRC_INACTIVE state. The capability information may include one or multiple of the following capability indications:

- an indication to (not) support configured UL grant(s) in RRC_INACTIVE state (of a serving cell);
- an indication to (not) support multiple configured UL grant(s) in RRC_INACTIVE state (of a serving cell);
- an indication of the exact maximum number of configured UL grant(s) in RRC_INACTIVE state (of a serving cell); and
- an indication to (not) support data transmission in RRC_INACTIVE state.

The network may transmit the capability indication(s) to its serving UE via SIB (e.g., SIB1 or SIB2 or small-data-transmission-specific SIB) for UE(s) in RRC_INACTIVE state.

The network may transmit the capability indication(s) to its serving UE via dedicated signaling (e.g., RRC signaling) for UE(s) in RRC_CONNECTED state. The network may transmit the capability indication(s) to its serving UE (via dedicated signaling) only after the UE indicates that it supports RRC_INACTIVE state (e.g., the UE has indicated inactiveState-r15 to the network). The configured UL grant may be a CG Type 1 configuration or a CG Type 2 configuration.

The capability indication may be a flag, a parameter with an enumerate data format (e.g., ENUMERATE {TRUE}, or ENUMERATE {TRUE, FALSE}), or a bit indication. For example, the capability indication may be set to value "0" to indicate that (multiple) configured UL grant(s) in RRC_INACTIVE state is not supported for the corresponding serving cell, and set to value "1" to indicate that (multiple) configured UL grant(s) in RRC_INACTIVE state is supported for the corresponding serving cell.

The capability indication may be a "TRUE" indication. For example, if this capability indication is present (and with a value "TRUE"), (multiple) configured UL grant(s) in RRC_INACTIVE state is supported for the corresponding serving cell. In contrast, the absence (or a value "FALSE") of this capability indication value may indicate that (multiple) configured UL grant (s) in RRC_INACTIVE state is not supported for the corresponding serving cell.

A UE in RRC_CONNECTED state may transmit the RRC_INACTIVE configured UL grant service/modification request and/or any of the UE radio access capability parameter(s), if at least one of the conditions listed below are satisfied:
  the UE has received, from the network, the indication to support (multiple) configured UL grant(s) in RRC_INACTIVE state; and
  the UE has not received, from the network, the indication to not support (multiple) configured UL grant(s) in RRC_INACTIVE state.

A UE that has been configured with (multiple) configured UL grant(s) for UL transmission in RRC_INACTIVE state and is currently in RRC_INACTIVE state may perform one or multiple of the following actions upon reception, from the network, of an indication that (multiple/all) configured UL grant(s) in RRC_INACTIVE state is not supported:
  clear/suspend (all) the configured UL grant(s) (configurations) that that UE has been using for UL transmission in RRC_INACTIVE state;
  flush the soft buffer corresponding to all DL HARQ processes (that has been used while the UE is in RRC_INACTIVE;
  set the NDIs for all UL HARQ process(es) (that corresponds to the cleared/suspended CG configuration(s)) to the value 0;
  release the LCH parameter(s) (e.g., LCH mapping restriction(s)) that the UE applies for UL transmission while in RRC_INACTIVE state;
  reset the MAC entity;
  release the default MAC Cell Group configuration;
  re-establish RLC entities for SRB1;
  suspend all DRB(s) and SRB(s), except SRB0;
  indicate PDCP suspend to lower layers of all DRBs;
  apply CCCH configuration provided in 3GPP TS 38.331 V15.7.0;
  apply preconfigured DRB configuration;
  stop a specific timer corresponding to the cleared/suspended configured UL grant(s) (configurations). The specific timer may be a timer to control the validity of the configured UL grant(s) (configurations). The specific timer may be a timer to control the validity of the TA corresponding to the configured UL grant(s) (configurations);
  reset a specific counter corresponding to the cleared/suspended configured UL grant(s) (configurations). The counter may be used to indicate the number of UL transmissions via the corresponding cleared/suspended configured UL grant(s) (configurations);
  cancel, if any, triggered Scheduling Request procedure(s);
  cancel, if any, triggered Buffer Status Reporting procedure(s); and
  cancel, if any, triggered Power Headroom Reporting procedure(s).

The (number of) UL HARQ processes that correspond to the CG configuration(s) for UL transmission while a UE is in RRC_INACTIVE state may be configured, by the network, to the UE via RRC signaling (e.g., configured in (suspendConfig IE) of RRCRelease message). Hence, after the UE enters RRC_INACTIVE state, the UE may determine the HARQ process ID of each PUSCH resource associated with these configured UL grant configuration(s). Such a HARQ process ID may be determined based on a preconfigured equation.

The preconfigured DRB configuration may include parameters such as PDCP-Config, RLC-Config, ul-RLC-Config, logicalChannelIdentity, LogicalChannelConfig of one or multiple DRBs that may be used while the UE is in RRC_INACTIVE state. PDCP-Config may refer to a PDCP configuration. RLC-Config may refer to a UL RLC configuration. logicalChannelIdentity may refer to an LCH identity. LogicalChannelConfig may refer to an LCH configuration.

If a UE in RRC_INACTIVE state has been configured with (multiple) configured UL grant(s) for UL transmission in RRC_INACTIVE state and receives an indication (from the network) that (multiple) configured UL grant(s) in RRC_INACTIVE state is not supported, the UE may stop performing UL transmission of incoming data from the DRB(s) and SRB(s) on the configured RRC_INACTIVE state. In this case, the UE may suspend all DRB(s) and SRB(s) except SRB0. Moreover, the UE may clear/suspend the configured UL grant(s) that were configured for the UE to perform UL transmission in RRC_INACTIVE state. Moreover, the UE may flush the HARQ buffer(s) which corresponds to the cleared/suspended configured UL grant(s). Moreover, the UE may start applying the default SRB configuration and/or CCCH configuration and/or preconfigured DRB configuration.

Upon the UE receiving the indication that (multiple) configured UL grant(s) in RRC_INACTIVE state is not supported from the network, the UE may initiate an RRC connection resume procedure (e.g., when there is UL data pending for transmission).

RRC_INACTIVE Configured UL Grant Service/Modification Request

A UE may transmit an RRC_INACTIVE configured UL grant service/modification request in order to inform the network of the parameters and/or parameter values that it prefers regarding the CG configurations for UL transmission in RRC_INACTIVE state. The network may provide proper CG configuration for the UE to perform UL transmission by reading the information from the RRC_INACTIVE configured UL grant service/modification request. The RRC_INACTIVE configured UL grant service/modification request may be transmitted by the UE in both RRC_CONNECTED state and RRC_INACTIVE state (e.g., the UE may transmit such a request via a UL resource corresponding to a CG configuration in RRC_INACTIVE state (e.g., a UL resource that may be used for UL transmission while a UE is in RRC_INACTIVE state). The RRC_INACTIVE configured UL grant service/modification request may be included in an RRC resume request message (or "RRCResumeRequest message") (along with a new ResumeCause which allows the UE to indicate to the network that it would like modification/extension of CG configuration(s) in RRC_INACTIVE state). The RRC_INACTIVE configured UL grant service/modification request may be transmitted on SRB0 when a UE is in RRC_INACTIVE state and/or RRC_CONNECTED state. The UE may transmit the RRC_INACTIVE configured UL grant service/modification request to the network when one or multiple of the following conditions (1) to (11) have been satisfied:
  (1) The UE has received, from the network, the indication to support (multiple) configured UL grant(s) in RRC_INACTIVE state.
  (2) The UE has not received, from the network, the indication to not support (multiple) configured UL grant(s) in RRC_INACTIVE state.
  (3) The UE has indicated, to the network, its capability to support (multiple) configured UL grant(s) in RRC_INACTIVE state.
  (4) The UE has indicated, to the network, its capability to support the reporting of the RRC_INACTIVE configured UL grant service/modification request.

(5) The UE has received, from the network, (multiple) configured UL grant(s) for the UE to perform UL transmission in RRC_INACTIVE state (and those configured UL grant(s) have not been cleared/suspended).

(6) The UE has been configured, by the network, to perform reporting of the RRC_INACTIVE configured UL grant service/modification request.

(7) The UE has indicated that it supports RRC_INACTIVE state (e.g., the UE has indicated inactiveState-r15 to the network).

(8) A prohibit timer, TCGservicerequest, is not running.

(9) The amount of pending UL data is higher than a threshold.

(10) The UL data maps to a radio bearer/LCH which is not supported by the current CG configuration. For example, the UL data may not be transmitted via the current CG.

(11) TA (value) is valid or not valid.

The RRC_INACTIVE configured UL grant service/modification request may include one or multiple of the following information:

number of configured UL grant configurations that the UE would like to be configured for UL transmission in RRC_INACTIVE state;

periodicity(es) of one or multiple configured UL grant configurations for UL transmission in RRC_INACTIVE state;

TBS of one or multiple configured UL grant configurations for UL transmission in RRC_INACTIVE state;

timing offset of one or multiple configured UL grant configurations for UL transmission in RRC_INACTIVE;

number of HARQ process of each of the one or multiple configured UL grant configurations for UL transmission in RRC_INACTIVE state;

the information of buffer status for pending UL data;

a bit indication to indicate that the UE is interested in configured UL grant configurations for UL transmission in RRC_INACTIVE state; and a bit indication to indicate that the UE is no longer interested in configured UL grant configurations for UL transmission in RRC_INACTIVE state.

The network may configure the UE to perform reporting of the RRC_INACTIVE configured UL grant service/modification request via RRC signaling while the UE is in RRC_CONNECTED state. In the present disclosure, such a configuration (e.g., configuration of reporting the RRC_INACTIVE configured UL grant service/modification request) may refer to a cgServiceRequestConfig IE.

The timing offset may refer to the time point at which a UE may perform the first UL transmission on a configured UL grant configuration in RRC_INACTIVE state. The timing offset may be in unit of symbols, slots, subframe, system frames, hyper frames, milliseconds, seconds, minutes, hours, and days thereof. The timing offset may be based on UTC time.

A prohibit timer, TCGservicerequest, may be used to ensure that the UE does not transmit RRC_INACTIVE configured UL grant service/modification request too frequently. While the TCGservicerequest is running, the UE may be prohibited from transmitting the RRC_INACTIVE configured UL grant service/modification request. In other words, the UE may only transmit RRC_INACTIVE configured UL grant service/modification request if the TCGservicerequest is not running. The TCGservicerequest may be (re)started upon transmission of the RRC_INACTIVE configured UL grant service/modification request. On the other hand, TCGservicerequest may be stopped upon initiating the connection re-establishment/resume procedures or upon receiving the cgServiceRequestConfig set to release or upon the UE being requested to enter RRC_IDLE state (e.g., upon reception of an RRCRelease message without suspendConfig). The TCGservicerequest may be a T380 timer which is provided in 3GPP TS 38.331 V15.7.0 (and included in the suspendConfig of the RRCRelease message). The value of the TCGservicerequest may be configured in the suspendConfig of the RRCRelease message, thus the UE may start applying the TCGservicerequest upon reception of suspendConfig provided in 3GPP TS 38.331 V15.7.0.

The TCGservicerequest may be in unit of symbols, slots, subframe, system frames, hyper frames, milliseconds, seconds, minutes, hours or days.

The RRC_INACTIVE configured UL grant service/modification request may be a (UL) MAC CE. A UE (in RRC_INACTIVE state) may indicate to the network to the (de) activate one or more CG configuration(s) that are used for UL transmission in RRC_INACTIVE state. This (UL) MAC CE may be sent on a UL resource corresponding to a CG configuration in RRC_INACTIVE state (e.g., a UL resource that may be used for UL transmission while the UE is in RRC_INACTIVE state).

Configuration of (Multiple) Configured UL Grant(s) and Logical Channel Parameters for UEs to Perform UL Transmission in RRC_INACTIVE State A UE may be configured with multiple CG configurations in a single cell. Multiple CG configurations may be active/activated simultaneously in the same BWP of a serving cell. In order to support UL transmission on UL resources (e.g., PUSCH resources) corresponding to one or multiple CG configurations in RRC_INACTIVE state, a UE may keep the CG configurations configured while in RRC_CONNECTED state even if it has entered RRC_INACTIVE state or apply/be configured with a new set of CG configurations while in RRC_INACTIVE state. If UL transmission on UL resources (e.g., PUSCH resources) corresponding to multiple CG configurations is supported in RRC_INACTIVE state, relevant LCH parameters (e.g., LCP mapping restrictions) may be required in RRC_INACTIVE state in order to properly map the data from different LCHs (that corresponds to different DRBs/SRBs) to different CG configurations for UL transmission in RRC_INACTIVE state. In this sense, a UE may either keep the LCH parameters (e.g., LCP mapping restrictions) configured in LogicalChannelConfig IE provided in 3GPP TS 38.331 V15.7.0 while in RRC_CONNECTED state even if it has entered RRC_INACTIVE or apply/be configured with a new set of LCH parameters (e.g., LCP mapping restrictions) while in RRC_INACTIVE state.

One or multiple pieces of specific information described below (e.g., one or multiple CG configurations, one or multiple Logical channel parameters, an indication to indicate that the UE should apply configured UL grant configuration(s) that are configured by the network during RRC_CONNECTED, and/or an indication to indicate that the UE should apply the logical channel parameters (e.g., LogicalChannelConfig IE) that are configured by the network during RRC_CONNECTED state) may be transmitted while the UE is in RRC_CONNECTED/RRC_INACTIVE state. Upon reception of one or multiple pieces of the specific information, the UE may apply the received specific information upon/during/after entering RRC_INACTIVE state. One or multiple pieces of the specific information may be included in the (SuspendConfig IE of the) RRCRelease message and transmitted to a UE when a network needs to transition a UE from RRC_CONNECTED state to RRC_I-

NACTIVE state. One or multiple pieces of the specific information may be included in an RRCReconfiguration message and transmitted to a UE while the UE is in RRC_CONNECTED state. One or multiple pieces of the specific information may be included in a SIB and transmitted to a UE while the UE is in RRC_INACTIVE state. One or multiple pieces of the specific information may be included in dedicated RRC signaling and transmitted to a UE while the UE is in RRC_INACTIVE state (e.g., in the RRCRelease message in response to a UL transmission on a CG by the UE in RRC_INACTIVE state). One or multiple pieces of the specific information may be included in a paging message and transmitted to a UE while the UE is in RRC_INACTIVE state.

One or Multiple CG Configurations

As described previously, the specific information may include a list of one or multiple CG configurations (which is referred to as "ConfiguredGrantConfigList" in the present disclosure). The UE may be provided with the ConfiguredGrantConfigList.

The ConfiguredGrantConfigList may contain one or multiple CG configurations (e.g., ConfiguredGrantConfig IE provided in 3GPP TS 38.331 V15.7.0). Each of the CG configurations includes the parameters that may be applied by the UE in RRC_INACTIVE state. (e.g., the parameters the same as the parameters required to configure a CG Type 1).

The ConfiguredGrantConfigList may be a list that includs one or more configuration grant configuration indices (e.g., ConfiguredGrantConfigIndex). Based on the CG configuration indices, the UE may identify which of the CG configuration(s) (e.g., ConfiguredGrantConfig IE), configured while in RRC_CONNECTED state, may be applied after the UE performs state transition from RRC_CONNECTED state to RRC_INACTIVE state. The UE may release/suspend the CG configuration(s) which is not identified/applied after the UE performs state transition from RRC_CONNECTED state to RRC_INACTIVE state. The CG configuration index may be unique within a MAC entity/group of cells/cell/BWP. The CG configuration index may be configured by the network.

The ConfiguredGrantConfigList may (only) be applied by a UE when it is in RRC_INACTIVE state. When the UE receives a ConfiguredGrantConfigList in (the SuspendConfig of) an RRCRelease message or other dedicated RRC signaling while in RRC_CONNECTED state, the UE may not perform MAC reset when transitioning from RRC_CONNECTED state to RRC_INACTIVE state.

When the UE receives a ConfiguredGrantConfigList in (the SuspendConfig of) an RRCRelease message or other dedicated RRC signaling while in RRC_CONNECTED state, the UE may not consider the configured time alignment timers (e.g., timeAlignmentTimers, which are associated with a PTAG and/or STAG) as expired while performing MAC reset when transitioning from RRC_CONNECTED state to RRC_INACTIVE state. The timeAlignmentTimers may be provided in 3GPP TS 38.321 V15.7.0.

When the UE receives the ConfiguredGrantConfigList in (the SuspendConfig of) an RRCRelease message or other dedicated RRC signaling while in RRC_CONNECTED state, the UE may consider all the configured timeAlignmentTimers as expired as part of a MAC reset when transitioning from RRC_CONNECTED state to RRC_INACTIVE state. However, during the MAC reset, the UE may not set the NDIs for the UL HARQ processes (associated with CG configurations as listed in the ConfiguredGrantConfigList) to the value 0. Moreover, during the MAC reset, the UE may not clear the soft buffer for the DL HARQ processes.

When the UE receives the ConfiguredGrantConfigList in (the SuspendConfig of) an RRCRelease message or other dedicated RRC signaling while in RRC_CONNECTED state, the UE may consider all the configured timeAlignmentTimers as expired as part of a MAC reset when transitioning from RRC_CONNECTED state to RRC_INACTIVE state. However, the UE may still perform UL transmission on the UL resources (e.g., PUSCH resources) configured/indicated in the ConfiguredGrantConfigList.

When the UE receives the ConfiguredGrantConfigList in (the SuspendConfig of) an RRCRelease message or other dedicated RRC signaling while in RRC_CONNECTED state, the UE may consider all the configured timeAlignmentTimers as expired as part of a MAC reset when transitioning from RRC_CONNECTED state to RRC_INACTIVE state. However, the UE may not clear/suspend the UL resource (e.g., PUSCH resource) configured/indicated in the ConfiguredGrantConfigList. The CG configuration(s) corresponding to the CG configuration index(es) indicated in the ConfiguredGrantConfigList may not be cleared/suspended. The UL resource (e.g., PUSCH resource) configured in the ConfiguredGrantConfigList may not be cleared/suspended. The UE may clear/suspend the CG configuration(s) corresponding to the CG configuration index(es) which is not indicated in ConfiguredGrantConfigList.

A UE may receive, from the network, a ConfiguredGrantConfigList IE in (the SuspendConfig IE of the) RRCRelease message while it is in RRC_CONNECTED state. Subsequently, after the UE enters RRC_INACTIVE state, the UE may perform UL transmission on the PUSCH resources corresponding to one or multiple CG configurations provided in the ConfiguredGrantConfigList IE. Moreover, the presence of the ConfiguredGrantConfigList IE in (the SuspendConfig IE of the) RRCRelease message may also imply that the UE needs to apply the LogicalChannelConfig IE configured by the network during RRC_CONNECTED state.

A UE may receive, from the network, a ConfiguredGrantConfigList IE in an RRCReconfiguration message or another dedicated RRC signaling while it is in RRC_CONNECTED state. The ConfiguredGrantConfigList IE may only be used by the UE while the UE is in RRC_INACTIVE state. After the UE enters RRC_INACTIVE state, the UE may perform UL transmission on the PUSCH resources corresponding to one or multiple CG configurations provided in the ConfiguredGrantConfigList IE in the RRCReconfiguration. The presence of ConfiguredGrantConfigList IE in the RRCReconfiguration message or another dedicated RRC signaling may also imply that the UE needs to apply the LogicalChannelConfig IE configured by the network during RRC_CONNECTED state. Moreover, the UE may not release/clear the ConfiguredGrantConfigList IE after the UE transits from RRC_CONNECTED state to RRC_INACTIVE state.

A UE may receive, from the network, a ConfiguredGrantConfigList IE in a SIB while the UE is in RRC_INACTIVE state. The UE may perform UL transmission on the PUSCH resources corresponding to one or multiple CG configurations provided in the ConfiguredGrantConfigList IE.

A UE may receive, from the network, a ConfiguredGrantConfigList IE in a paging message while the UE is in RRC_INACTIVE state. The UE may perform UL transmission on the PUSCH resources corresponding to one or multiple CG configurations provided in the ConfiguredGrantConfigList IE.

Logical Channel Parameters

A UE may be provided with a list of one or multiple RLC bearer configurations (e.g., rlc-BearerToAddModList IE), a list of LCH identities, a list of DRB identities and/or SRB identities, etc.

A list of one or multiple RLC bearer configurations (e.g., rlc-BearerToAddModList IE), a list of LCH identities, a list of DRB identities and/or SRB identities, etc., may (only) be applied by a UE when the UE is in RRC_INACTIVE state.

One or more RLC bearer configurations (e.g., RLC-BearerConfig IE) may be included in a list (e.g., Hc-BearerToAddModList IE). Moreover, each RLC bearer configuration (e.g., RLC-BearerConfig IE) in the list may include an SRB identity (or "SRB-Identity")/a DRB identity (DRB-Identity), an LCH identity (or "LogicalChannelIdentity"), an LCH configuration (or "LogicalChannelConfig"), etc.

The LogicalChannelConfig in an RLC bearer configuration may include logical channel parameters (e.g., LCP mapping restrictions) that corresponds to the LCH and SRB/DRB (e.g., SRB1) as configured in the same RLC bearer. A LogicalChannelConfig IE that corresponds to an LCH may include one or more of LCH-related parameters including priority, prioritisedBitRate, bucketSizeDuration, maxPUSCH-Duration, configuredGrantType1Allowed, allowedCG-List, etc. Moreover, an allowed CG list (or "allowedCG-List") from a LogicalChannelConfig may be a list of one or multiple CG configurations on which the data from the LCH identified by the LogicalChannelConfig can perform UL transmission. In contrast, the data from this LCH may not be transmitted on a CG configuration that is not included in the allowedCG-List.

The UE may be provided with a list of LCH identities (e.g., LogicalChannelIdentity). Based on the list of LCH identities, the UE may identify which of the LCH configuration(s) (e.g., LogicalChannelConfig IE), configured while in RRC_CONNECTED state, may be applied after the UE performs state transition from RRC_CONNECTED state to RRC_INACTIVE state. The LCH identities may be unique within a MAC entity. The LogicalChannelConfig IE and the RLC-BearerConfig IE identified by a LogicalChannelIdentity in the list may be applied after the UE performs state transition from RRC_CONNECTED state to RRC_INACTIVE state.

The UE may be provided with a list of DRB identities (e.g., DRB-Identity) and/or SRB identities (e.g., SRB-Identity). Based on the list(s), the UE may identify which of the RLC bearer configuration(s) (e.g., RLC-BearerConfig IE), configured while in RRC_CONNECTED, may be applied after the UE performs state transition from RRC_CONNECTED state to RRC_INACTIVE state. The DRB identities and/or SRB identities may be unique within a MAC entity. An RLC-BearerConfig IE and LogicalChannelConfig IE identified by a DRB Identity/SRB-Identity in the list may be applied after the UE performs state transition from RRC_CONNECTED state to RRC_INACTIVE state.

When a UE receives one or more RLC bearer configurations (e.g., RLC-BearerConfig) in (the SuspendConfig of) an RRCRelease message or other dedicated RRC signaling while in RRC_CONNECTED state, the DRB(s) and/or SRB(s) corresponding to the RLC bearer configuration(s) may not be suspended when the UE performs state transition from RRC_CONNECTED state to RRC_INACTIVE state. A DRB may be regarded as corresponding to an RLC bearer configuration if this DRB (e.g., identified by a DRB-Identity) is included in the RLC bearer configuration (e.g., RLC-BearerConfig). Moreover, the PDCP entity of the DRB(s) corresponding with the transmitted RLC bearer configurations (e.g., RLC-BearerConfig) may not be suspended.

When the UE receives a list of LCH identities (e.g., LogicalChannelIdentity) in (the SuspendConfig of) an RRCRelease message or other dedicated RRC signaling while in RRC_CONNECTED state, the DRB(s) and/or SRB(s) corresponding to the LCH identities in the list may not be suspended when the UE performs state transition from RRC_CONNECTED state to RRC_INACTIVE state. The PDCP entity of the DRB(s) that correspond to the LCH identity(s) from the list(s) may not be suspended when the UE performs state transition from RRC_CONNECTED state to RRC_INACTIVE state. A DRB/SRB may be regarded as corresponding to an LCH identity if the DRB-Identity/SRB-Identity of this DRB/SRB and the LCH identity (e.g, LogicalChannelIdentity) are included in the same RLC bearer configuration (e.g., RLC-BearerConfig).

When the UE receives a list of DRB identities and/or SRB identities in (the SuspendConfig of) an RRCRelease message or other dedicated RRC signaling while in RRC_CONNECTED state, the DRB(s) and/or SRB(s) in the list may not be suspended when the UE performs state transition from RRC_CONNECTED state to RRC_INACTIVE state. Moreover, the PDCP entity of the DRB(s) from the list may not be suspended when the UE performs state transition from RRC_CONNECTED state to RRC_INACTIVE state.

A UE may receive, from the network, an rlc-BearerToAddModList IE in (the SuspendConfig IE of the) an RRCRelease message or any other dedicated RRC message in RRC_CONNECTED state. The rlc-BearerToAddModList IE may include one RLC bearer configuration. Moreover, an LCH configuration #1 (or "LogicalChannelConfig 1") may be included in the RLC bearer configuration. Furthermore, the allowedCG-List may be included in the LogicalChannelConfig 1. When the UE enters RRC_INACTIVE state, the data (e.g., UL MAC SDU) from the LCH that is configured in the same RLC bearer configuration as the LogicalChannelConfig 1 may only map to the CG configuration(s) as listed in the allowedCG-List.

An Indication to Indicate that the UE should Apply Configured UL Grant Configuration(s) that are Configured by the Network During RRC_CONNECTED The indication may be a bit indicator. For example, the bit indicator may be set to value "1" or "TRUE" (e.g., ENUMERATE {TRUE}, ENUMERATE {TRUE, FALSE}) to indicate that the UE should apply (all) configured UL grant configuration(s) that are configured by the network during RRC_CONNECTED state. In contrast, the bit indicator may be set to value "0" or "FALSE" to indicate that the UE should not apply (any) configured UL grant configuration(s) that are configured by the network during RRC_CONNECTED state. Instead, the UE may apply the preconfigured CG configuration(s). For example, a bitmap containing x bits may be used to indicate a set of x CG configurations to be applied by a UE for UL transmission in RRC_INACTIVE state. The set of x CG configurations may be configured by the network while the UE is in RRC_CONNECTED state. Each bit in the bitmap may map to one CG configuration from the set of x CG configurations, e.g., to indicate whether or not the UE should apply the mapped CG configuration for UL transmission while the UE is in RRC_INACTIVE state.

The indication may indicate whether a UE should clear/suspend the corresponding CG configuration(s), as configured by the network during RRC_CONNECTED state, when the UE enters RRC_INACTIVE state. For example, the indication may be set to value "1" or "TRUE" to indicate that the UE should not clear/suspend (all) configured UL grant configuration(s), as configured by the network during RRC_CONNECTED state, when the UE enters RRC_INACTIVE state. In contrast, the indication may be set to value "0" or "FALSE" to indicate that the UE should clear/suspend (any) configured UL grant configuration(s), as configured by the network during RRC_CONNECTED state, when the UE enters RRC_INACTIVE state. For example, a bitmap containing x bits may be used to indicate whether a set of x CG configurations, as configured by the network in RRC_CONNECTED state, should be cleared/suspended when the UE enters RRC_INACTIVE state. Each bit in the bitmap may be mapped to one CG configuration from the set of x CG configurations, e.g., to indicate whether the UE should clear/suspend the mapped CG configuration when it enters RRC_INACTIVE state.

The presence of the indication may indicate that the UE should apply (all) configured UL grant configuration(s) that are configured by the network during RRC_CONNECTED state. Otherwise, the UE may not apply (any) configured UL grant configuration(s) that are configured by the network during RRC_CONNECTED state. Instead, the UE may apply the preconfigured CG configuration(s).

The presence of the indication may further indicate whether the UE should clear/suspend the corresponding CG configuration(s). For example, the presence of the indication may indicate that the UE should not clear/suspend (all) configured UL grant configuration(s) that are configured by the network during RRC_CONNECTED state. In contrast, the absence of the indication may indicate that the UE should clear/suspend (any) configured UL grant configuration(s) that are configured by the network during RRC_CONNECTED state.

The indication may be a bit indicator. For example, the indication may be set to value "1" or "TRUE" to indicate that the UE should apply preconfigured CG configuration(s) when it enters RRC_INACTIVE state. In contrast, the indication may be set to value "0" or "FALSE" to indicate that the UE should not apply preconfigured CG configuration(s) when it enters RRC_INACTIVE state.

When the indication is transmitted to a UE in (the SuspendConfig of) an RRCRelease message, the UE may not perform a MAC reset when transitioning from RRC_CONNECTED state to RRC_INACTIVE state.

When the indication is transmitted to a UE in (the SuspendConfig of) an RRCRelease message, the UE may not consider the configured timeAlignmentTimers (associated with the PTAG and/or STAG) as expired while performing a MAC reset when transitioning from RRC_CONNECTED state to RRC_INACTIVE state.

When the indication is transmitted to a UE in (the SuspendConfig of) an RRCRelease message, the UE may consider all the configured timeAlignmentTimers as expired as part of a MAC reset when transitioning from RRC_CONNECTED state to RRC_INACTIVE state. However, during the MAC reset, the UE may not set the NDIs for the UL HARQ processes (associated with CG configuration(s) as configured in RRC_CONNECTED) to the value 0. Moreover, during the MAC reset, the UE may not clear the soft buffer for the DL HARQ processes.

When the indication is transmitted to a UE in (the SuspendConfig of) an RRCRelease message, the UE may consider all the configured timeAlignmentTimers as expired as part of a MAC reset when transitioning from RRC_CONNECTED state to RRC_INACTIVE state. However, the UE may still perform UL transmission on the UL resources (e.g., PUSCH resource) corresponding to the CG configuration(s) that are configured while the UE is in RRC_CONNECTED state.

When the indication is transmitted to a UE in (the SuspendConfig of) an RRCRelease message, the UE may consider all the configured timeAlignmentTimers as expired as part of a MAC reset when transitioning from RRC_CONNECTED state to RRC_INACTIVE state. However, the UE may not clear/suspend the UL resource (e.g., PUSCH resource) corresponding to the CG configuration(s) that are configured while the UE is in RRC_CONNECTED state.

An Indication to Indicate that the UE should Apply the Logical Channel Parameters (e.g., LogicalChannelConfig IE) that are Configured by the Network During RRC_CONNECTED The indication may be a bit indicator. For example, a value "1" or "TRUE" (e.g., ENUMERATE {TRUE}, ENUMERATE {TRUE, FALSE}) of the indication may indicate that the UE should apply logical channel parameters (e.g., LogicalChannelConfig IE) that are configured by the network during RRC_CONNECTED. In contrast, a value "0" or "FALSE" of the indication may indicate that the UE should not apply logical channel parameters (e.g., LogicalChannelConfig IE) that are configured by the network during RRC_CONNECTED state.

The presence of the indication may indicate that the UE should apply logical channel parameters (e.g., LogicalChannelConfig IE) that are configured by the network during RRC_CONNECTED state. Otherwise, the UE may not apply logical channel parameters (e.g., LogicalChannelConfig IE) that are configured by the network during RRC_CONNECTED state.

When the indication is transmitted to a UE, the DRB(s) and/or SRB(s) configured while the UE is in RRC_CONNECTED state may not be suspended when the UE performs state transition from RRC_CONNECTED state to RRC_INACTIVE state.

When the indication is transmitted to a UE, the PDCP entity of the DRB(s) configured while the UE may not be suspended when the UE performs state transition from RRC_CONNECTED state to RRC_INACTIVE state.

If the configuration(s) and/or parameter(s) from one or multiple pieces of the information (e.g., one or multiple CG configuration(s) and/or LCH parameters to be applied by a UE while it is in RRC_INACTIVE) is included in an RRCReconfiguration message or any other dedicated RRC message, and transmitted to a UE while the UE is in RRC_CONNECTED state, the UE may then (re)store the configuration (e.g., store the configuration as AS context or UE INACTIVE AS context) while it is in RRC_CONNECTED state/RRC_INACTIVE state. Subsequently, when the UE is requested to enter RRC_INACTIVE state (e.g., the UE receives an RRCRelease message with suspendConfig from the network), the UE may start applying the configuration (e.g., restore the configuration from the stored UE Inactive AS context). In contrast, when the UE is requested to enter RRC_IDLE state (e.g., the UE receives an RRCRelease message without suspendConfig from the network), the UE may release/remove/cancel the configuration(s)/parameter(s) from one or multiple pieces of the information (e.g., release the configuration from the stored UE Inactive AS context, if stored).

If a first set of configuration(s) and/or parameter(s) from one or multiple pieces of the information (e.g., a first set of one or multiple CG configuration(s) and/or LCH parameters to be applied by a UE while it is in RRC_INACTIVE state) is included in an RRCReconfiguration message, and transmitted to a UE while the UE is in RRC_CONNECTED state, the UE may store the configuration (e.g., store the configuration as AS context or UE INACTIVE AS context) while it is in RRC_CONNECTED state. Subsequently, when the UE receives an RRCRelease message with suspendConfig from the network, which includes a second set of configuration(s) and/or parameter(s) from one or multiple pieces of the information (e.g., a second set of one or multiple CG configuration(s) and/or LCH parameters to be applied by a UE while it is in RRC_INACTIVE state), the UE may apply the second set of configuration(s) and/or parameter(s) after entering RRC_INACTIVE state. Here, after the UE receives the second set of configuration(s), the UE may override the first set of configuration(s) with the second set of configuration(s).

The logical channel parameters and/or CG configuration(s) for a UE to apply in RRC_INACTIVE state may be preconfigured in the UE. Subsequently, upon one or multiple of the following conditions having been satisfied, the UE may apply the preconfigured logical channel parameters and/or preconfigured CG configuration(s) when it is in RRC_INACTIVE state.

The UE may receive an indication to apply the preconfigured logical channel parameter in (the suspendConfig of) an RRCRelease message or other RRC signaling.

The UE may receive an indication to apply the preconfigured CG configurations in (the suspendConfig of) an RRCRelease message or other RRC signaling.

The UE may not be configured, by the network, with logical channel parameters (e.g., LogicalChannelConfig IE) during RRC_CONNECTED state.

The UE may not be configured, by the network, with CG configuration(s) (e.g., configuredGrantConfig IE) during RRC_CONNECTED state.

The UE may not be configured or indicated, by the network, to apply an RRC_INACTIVE UL resource.

The UE in RRC_INACTIVE state may initiate an RRC connection resume procedure using a UL resource (e.g., PUSCH resource) corresponding to an activated configured UL grant.

The UE in RRC_INACTIVE state may initiate an RRC connection resume procedure using a UL resource (e.g., PUSCH resource) corresponding to an activated configured UL grant.

An RRC_INACTIVE UL resource may be (pre-)configured by the network via the methods described previously. The RRC_INACTIVE UL resource may be determined by a list of one or multiple CG configuration(s) that a UE may use while the UE is in RRC_INACTIVE state. The RRC_INACTIVE UL resource may be preconfigured by the UE or configured by the network via RRC signaling. The network may provide an indication (via RRC signaling) to a UE while it is in RRC_CONNECTED state. This indication may be used to indicate whether a UE is allowed to use the configuredGrantConfig IE when it is in RRC_INACTIVE state.

The preconfigured logical channel parameters may be one or multiple sets of logical channel parameters. Each set of logical channel parameters may include (but is not limited to) one or multiple of the LCH parameters illustrated in Table 1.

TABLE 1

Preconfigured logical channel parameters priority
prioritisedBitRate
bucketSizeDuration
logicalChannelGroup
maxPUSCH-Duration
configuredGrantType1Allowed
schedulingRequestID
logicalChannelSR-Mask
logicalChannelSR-DelayTimerApplied
bitRateQueryProhibitTimer
allowedCG-List (as described earlier)

Each set of logical channel parameters may be mapped to an LCH with a preconfigured LCH identity (e.g., logicalChannelIdentity). Each set of logical channel parameters may be mapped to a preconfigured RLC-BearerConfig including SRB identity (e.g., SRB Identity)/DRB-Identity (e.g., DRB-Identity), RLC-Config, etc. If a UE receives an indication to apply the preconfigured logical channel parameters in the (suspendConfig of) RRCRelease message or other dedicated RRC signaling while in RRC_CONNECTED state, the UE may apply the preconfigured logical channel parameters after entering RRC_INACTIVE state.

The preconfigured logical channel parameters may be referred to as the CCCH configuration. Moreover, the CCCH configuration may be extended to include more preconfigured LCH parameters (e.g., one or more LCH parameters as specified in Table 1). If a UE is required, by the network, to perform RRC state transmission from RRC_CONNECTED state to RRC_INACTIVE state (e.g., a UE in RRC_CONNECTED state receives an RRCRelease message with suspendConfig from the network), the UE may apply the CCCH configuration.

The preconfigured logical channel parameters may be referred to as the default SRB configuration. Moreover, the default SRB configuration may be extended to include more preconfigured LCH parameters (e.g., one or more LCH parameters as specified in Table 1). In one example, if a UE is required, by the network, to perform RRC state transmission from RRC_CONNECTED to RRC_INACTIVE (e.g., a UE in RRC_CONNECTED state receives an RRCRelease message with suspendConfig from the network), the UE may apply the default SRB configuration (e.g., SRB1, SRB2, SRB3, etc.).

The preconfigured CG configuration(s) may be a list of one or multiple CG configuration(s) (e.g., a list of one or multiple configuredGrantConfig IE). Moreover, each CG configuration may include the parameters that may be applied by the UE in RRC_INACTIVE state (e.g., same parameters as the parameters required to configure a CG Type 1). If a UE receives an indication to apply the preconfigured CG configurations in the (suspendConfig of the) RRCRelease message or other dedicated RRC signaling while in RRC_CONNECTED state, the UE may apply the preconfigured CG configuration(s) after entering RRC_INACTIVE state.

If a network sends an RRCRelease message (with suspendConfig IE) and the (suspendConfig IE of the) RRCRelease message does not include the logical channel parameters (e.g., LogicalChannelConfig IE), the UE may apply the preconfigured logical channel parameters in RRC_INACTIVE state.

If a UE initiates an RRC connection resume procedure, the UE may not apply the default SRB configuration and may not apply the CCCH configuration when one or multiple of the following conditions have been satisfied. Instead, the UE may continue applying the RRC_INACTIVE logical channel parameters and RRC_INACTIVE UL resource.

The UE has UL resources available for transmission in RRC_INACTIVE state (e.g., the UE has been configured, by the network, with one or multiple CG configuration(s) in RRC_INACTIVE state)

The UE has not received an indication to not support UL transmission (via configured UL grant) in RRC_INACTIVE state.

RRC_INACTIVE logical channel parameters and an RRC_INACTIVE UL resource may be preconfigured or configured by the network. RRC_INACTIVE logical channel parameters may be (pre-)configured by the network via the methods described previously. The RRC_INACTIVE logical channel parameters may be a list of one or multiple RLC bearer configurations (e.g., Hc-BearerToAddModList IE), a list of LCH identities, a list of DRB identities and/or SRB identities, a list of LogicalChannelConfig etc. The RRC_INACTIVE logical channel parameters may be applied by a UE only when it is in RRC_INACTIVE state. The RRC_INACTIVE logical channel parameters resource may be preconfigured by the UE or configured by the network via RRC signaling.

An RRC_INACTIVE UL resource may be (pre-)configured by the network via the methods described previously. The RRC_INACTIVE UL resource may be a list of one or multiple CG configuration(s) that a UE may use while it is in RRC_INACTIVE state. This resource may be preconfigured by the UE or configured by the network via RRC signaling.

If the network configures a UE with a set of logical channel parameters corresponding to LCH1 (e.g., the network configures a set of logical channel parameters corresponding to LCH1 via LogicalChannelConfig IE) while this UE is in RRC_CONNECTED state, and the set of logical channel parameters includes a mapping list that maps the data from LCH1 to one or multiple CG configuration(s) (e.g., the incoming data from LCH1 can be only transmitted on a PUSCH resource that corresponds to a CG configuration if the CG configuration is included in the mapping list. In contrast, the incoming data from LCH1 cannot be transmitted on a PUSCH resource that corresponds to a CG configuration if the CG configuration is not included in the mapping list). When the NW initiates an RRC connection release procedure (to perform state transition for a UE from RRC_CONNECTED state to RRC_INACTIVE state), the DRB and/or SRB that corresponds to LCH1 may not be suspended if at least one of the CG configuration(s) on the mapping list is not cleared/suspended when the UE transits from RRC_CONNECTED state to RRC_INACTIVE state. When the NW initiates RRC connection release procedure (to perform state transition for a UE from RRC_CONNECTED state to RRC_INACTIVE state), the DRB and/or SRB that corresponds to LCH1 may not be suspended if at least one of the CG configuration(s) on the mapping list may be used to perform UL transmission while the UE is in RRC_INACTIVE state.

If a UE is configured with a list of one or multiple CG configuration(s) (while it is in RRC_CONNECTED state), a specific CG configuration(s) that is from the list may be applied both when a UE is in RRC_CONNECTED state and RRC_INACTIVE state. If the UE transits from RRC_CONNECTED state to RRC_INACTIVE state (e.g., the UE performs an RRC connection release procedure), the UE may not clear/suspend the specific CG configuration(s). Here, a specific CG configuration may be referred to as a CG configuration that belongs to a specific entry in the list (e.g., the first or the last entry in the list)

If a UE is configured with a list of one or multiple DRB(s)/LCH(s)/SRB(s) (while it is in RRC_CONNECTED state), a specific DRB(s)/LCH(s)/SRB(s) that is from the list may be applied both when a UE is in RRC_CONNECTED state and RRC_INACTIVE state. Subsequently, if the UE transits from RRC_CONNECTED state to RRC_INACTIVE state (e.g., the UE performs an RRC connection release procedure), the UE may not suspend the specific DRB(s)/LCH(s)/SRB(s). Here, a specific DRB/LCH/SRB may be referred to as a DRB/LCH/SRB that belongs to a specific entry in the list (e.g., the first or the last entry in the list).

If data transmission in RRC_INACTIVE state is supported, a UE may not re-establish RLC entities for SRB1 upon performing an RRC connection release procedure to transition from RRC_CONNECTED state to RRC_INACTIVE state (e.g., upon the UE receiving an RRCRelease message with suspendConfig). Specifically, the UE may determine that data transmission in RRC_INACTIVE state is supported if one or multiple of the following conditions (1) and (2) has been satisfied:
- (1) The UE has a UL resource available for transmission in RRC_INACTIVE state (e.g., the UE has preconfigured or has been configured/indicated, by the network, one or multiple CG configuration(s) for UL transmission in RRC_INACTIVE state).
- (2) The UE has LCH available for data transmission in RRC_INACTIVE state (e.g., the UE has preconfigured or has been configured/indicated, by the network, one or multiple LCH(s)/DRB(s)/SRB(s) for UL transmission in RRC_INACTIVE state).

A UE that has been configured with (multiple) configured UL grant(s) for UL transmission in RRC_INACTIVE state and is currently in RRC_INACTIVE state may perform at least one of actions (1) to (17) listed below when the UE no longer needs to transmit UL data (e.g., if the UE in RRC_INACTIVE state has not performed UL transmission (on a specific CG configuration) for a consecutive number of times) or when the UE has moved outside of the serving cell's coverage (e.g., if the UE in RRC_INACTIVE state needs to perform TAU/RNAU or if the (DL) RSRP measured by the UE is below a certain threshold) or if the UE is no longer synchronised with the network (e.g., a timeAlignmentTimers used by the UE in RRC_INACTIVE has expired). The certain threshold may be configured per CG configuration/BWP/cell/cell group. The (DL) RSRP may be a cell-level RSRP, SSB/PBCH/CSI-RS-based RSRP, etc. The UE may measure the RSRP of an SSB/PBCH corresponding to a CG configuration, and clear/suspend the CG configuration if the measured RSRP of the SSB/PBCH corresponding to the CG configuration is below the certain threshold (configured for the CG configuration).
- (1) clear/suspend (all) the configured UL grant(s) (configurations) that the UE has been using for UL transmission in RRC_INACTIVE state;
- (2) flush the soft buffer corresponding to all DL HARQ process(es) (that has been used while the UE is in RRC_INACTIVE state);
- (3) set the NDIs for all UL HARQ process(es) (that corresponds to the cleared/suspended CG configuration(s)) to the value 0;
- (4) release the LCH parameter(s) (e.g., LCH mapping restriction(s)) that the UE applies for UL transmission while in RRC_INACTIVE state;
- (5) reset MAC;

(6) release the default MAC Cell Group configuration;
(7) re-establish RLC entities for SRB1;
(8) suspend all DRB(s) and SRB(s), except SRB0;
(9) indicate PDCP suspend to lower layers of all DRBs;
(10) apply CCCH configuration provided in 3 GPP TS 38.331 V15.7.0;
(11) apply preconfigured DRB configuration;
(12) stop a specific timer corresponding to the cleared/suspended configured UL grant(s) (configurations). The specific timer may be a timer to control the validity of the configured UL grant(s) (configurations). The specific timer may be a timer to control the validity of the TA corresponding to the configured UL grant(s) (configurations);
(13) reset a specific counter corresponding to the cleared/suspended configured UL grant(s) (configurations). The counter may be used to indicate the number of UL transmissions via the corresponding cleared/suspended configured UL grant(s) (configurations);
(14) cancel, if any, triggered Scheduling Request procedure(s);
(15) cancel, if any, triggered Buffer Status Reporting procedure(s);
(16) cancel, if any, triggered Power Headroom Reporting procedure(s); and
(17) transmit an RRC_INACTIVE configured UL grant service/modification request to the serving network (as described above).

Figure 2:
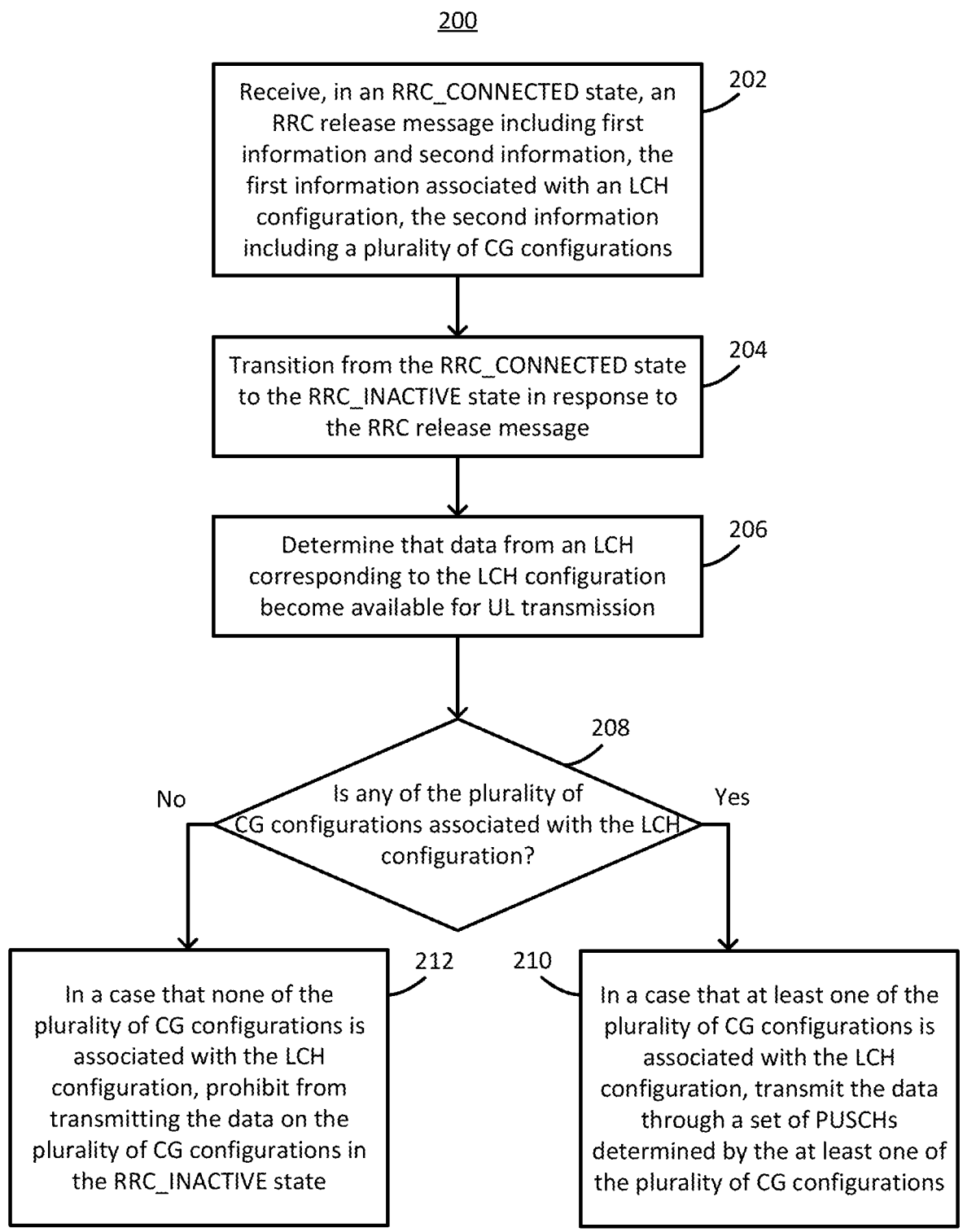
FIG. 2 illustrates a flowchart for a wireless communication method performed by a UE for performing transmissions in an RRC_INACTIVE state according to an implementation of the present disclosure.

FIG. 2 illustrates a flowchart for a wireless communication method 200 performed by a UE for performing transmissions in an RRC_INACTIVE state according to an implementation of the present disclosure. Although actions 202, 204, 206, 208, 210 and 212 are illustrated as separate actions represented as independent blocks in FIG. 2, these separately illustrated actions should not be construed as necessarily order-dependent. The order in which the actions are performed in FIG. 2 is not intended to be construed as a limitation, and any number of the disclosed blocks may be combined in any order to implement the method, or an alternate method. Moreover, each of actions 202, 204, 206, 208, 210 and 212 may be performed independent of other actions, and can be omitted in some implementations of the present disclosure.

In action 202, the UE may receive, in an RRC_CONNECTED state, an RRC release message (e.g., RRCRelease message with SuspendConfig) including first information and second information. The first information may be associated with an LCH configuration (e.g., LogicalChannelConfig). For example, the first information may include at least one of the following:

the LCH configuration;
a first identifier (e.g., logicalChannelIdentity) indicating the LCH configuration; and
a second identifier (e.g., DRB-Identity) indicating a DRB corresponding to the LCH configuration.

In such a case, the LCH may be considered associated with the first information if the first information includes the LCH configuration of the LCH, the first identifier indicating the LCH configuration, and/or the second identifier indicating a DRB corresponding to the LCH configuration.

The first information may further include a list that indicates the at least one of the plurality of CG configurations that is associated with the LCH configuration. For example, the list may be an allowed CG-List that contains one or more identifiers of CG configuration. On the other hand, the second information may include a plurality of CG configurations (e.g., corresponding PUSCH resources for each of the plurality of CG configuration, the periodicity of each of the plurality of CG configurations, the SSB/PBCH corresponding to each of the plurality of CG configurations, etc.). Each CG configuration may be (or correspond to) a ConfiguredGrantConfig IE that contains information needed by the UE to determine a set of CG resources (e.g., PUSCH resources) for UL transmission.

In action 204, the UE may transition from the RRC_CONNECTED state to the RRC_INACTIVE state in response to the RRC release message. In action 206, the UE may determine that data from an LCH corresponding to the LCH configuration becomes available for UL transmission (e.g., when the AS layer of the UE has had data to be transmitted). In action 208, the UE may determine whether any of the plurality of CG configurations is associated with the LCH configuration. In a case that at least one of the plurality of CG configurations is associated with the LCH configuration, then in action 210, the UE may transmit the data through a set of PUSCHs determined by the at least one of the plurality of CG configurations. In a case that none of the plurality of CG configurations is associated with the LCH configuration, then in action 212, the UE may be prohibited from transmitting the data on the plurality of CG configurations in the RRC_INACTIVE state. Moreover, the UE may initiate an RA procedure for the purpose of transmitting the data in the RRC_INACTIVE state. Alternatively, the UE may initiate an RRC resume procedure for the purpose of transmitting the data.

Whether the LCH configuration is associated with any of the plurality of CG configurations may depend on whether any of the plurality of CG configurations is indicated by the LCH configuration. For example, if one or more of the plurality of CG configurations is indicated by the LCH configuration (e.g., the LCH configuration includes an allowed CG list (or "allowed CG-List") that indicates the one or more of the plurality of CG configurations), the LCH configuration may be considered "associated with" the indicated one or more of the plurality of CG configurations. If no CG configuration is indicated by the LCH configuration, the LCH configuration is not considered associated with a CG configuration.

Figure 3:
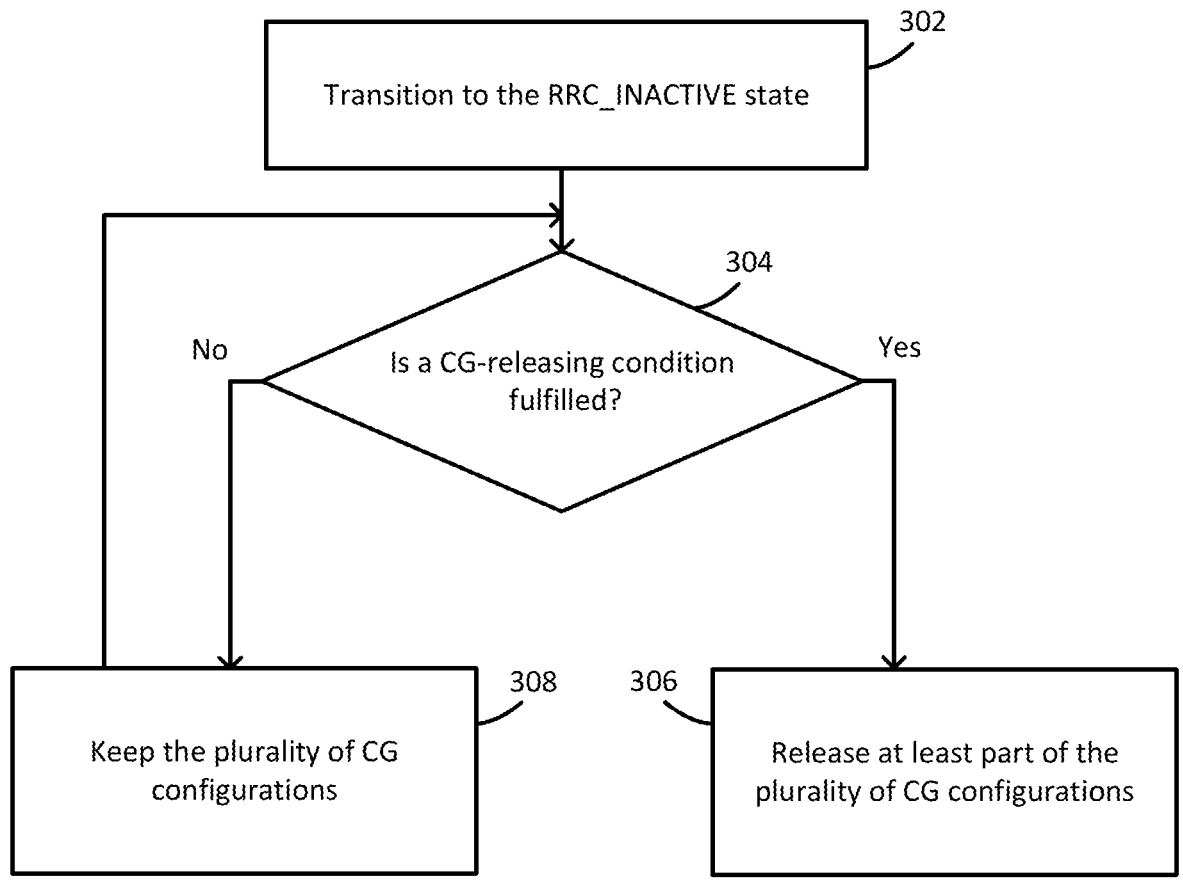
FIG. 3 illustrates a flowchart for a process for a UE in RRC_INACTIVE state to release CG configuration(s) according to an implementation of the present disclosure.

Once UE transitions to the RRC_INACTIVE state, a process for releasing CG configuration(s) may be initiated when certain CG-releasing condition(s) is fulfilled in order to improve the efficiency of resource utilization, as illustrated in FIG. 3.

FIG. 3 illustrates a flowchart for a process for a UE in RRC_INACTIVE state to release CG configuration(s) according to an implementation of the present disclosure. Once a CG configuration is released, the PUSCH resources determined by (or "derived from") the released CG configuration will no longer be reserved for the UE to perform UL transmission in the RRC_INACTIVE state, until the released CG configuration is resumed or reconfigured by the network.

In action 302, the UE may transition to the RRC_INACTIVE state. In action 304, when the UE is in the RRC_INACTIVE state, the UE may determine whether a CG-releasing condition is fulfilled. In action 306, if the outcome of the determination in action 304 is Yes, the UE may release at least part of (the PUSCH resources determined by) the plurality of CG configurations (included in the second information of the RRC release message). In action 308, if the outcome of the determination in action 304 is No, the UE may keep (or maintain) the plurality of CG configurations.

The CG-releasing condition may be one of the following:
the UE determines that UL transmission is no longer needed to be performed in the RRC_INACTIVE state;
the UE has moved outside of a coverage area of a serving cell;
the UE is not synchronized with the serving cell; and
the UE receives a release indicator in system information from the serving cell.

For example, the UE may release, after transitioning to the RRC_INACTIVE state, (only) a part of the plurality of CG configurations if no UL transmission has been performed on the part of the plurality of CG configurations for a consecutive number of times. The UE may release, after transitioning to the RRC_INACTIVE state, all of the plurality of CG configurations in a case that the UE has moved outside of a coverage area of a serving cell. The UE may release, after transitioning to the RRC_INACTIVE state, all of the plurality of CG configurations in a case that the UE is not synchronized with a serving cell. The UE may release, after transitioning to the RRC_INACTIVE state, all of the plurality of CG configurations in a case that the UE receives a release indicator in system information from a serving cell.

The CG-release condition(s) described previously may also be used as the CG-suspending condition(s). A process for suspending CG configuration(s) may be initiated when certain CG-suspending condition(s) is fulfilled. Once a CG configuration is suspended, the PUSCH resources determined by (or "derived from") the suspended CG configuration will be no longer reserved for the UE to perform UL transmission in the RRC_INACTIVE state, until the suspended CG configuration is resumed/reinitiated or reconfigured by the network.

The present disclosure provides method(s) and UE for performing transmission in RRC_INACTIVE state. The method(s) and UE are more flexible and are applicable for advanced scenarios compared with LTE scenarios. At least part of the method(s) and UE in the present disclosure support configuring multiple CG configurations for transmission in the RRC_INACTIVE state, but without the penalty of increased signaling overhead.

The following may be used to further disclose terms, examples, embodiments, implementations, actions, and/or behaviors:

The UL grant may be used to indicate a PUSCH resource. PUSCH resource may also be referred to as UL-SCH resource in the present disclosure.

User Equipment (UE): The UE may be referred to as a PHY/MAC/RLC/PDCP/SDAP entity. The PHY/MAC/RLC/PDCP/SDAP entity may be referred to as the UE.

MAC entity may also be referred to as UE in the present disclosure.

Network (NW): The NW may be a network node, a TRP, a cell (e.g., SpCell, PCell, PSCell, and/or SCell), an eNB, a gNB, and/or a base station.

Serving Cell: A PCell, a PSCell, or an SCell. The serving cell may be an activated or a deactivated serving cell.

Special Cell (SpCell): For Dual Connectivity operation, the term Special Cell refers to the PCell of the MCG or the PSCell of the SCG depending on if the MAC entity is associated to the MCG or the SCG, respectively. Otherwise, the term Special Cell refers to the PCell. A Special Cell supports PUCCH transmission and contention-based Random Access, and is always activated.

CC (Component Carrier): The CC may be a PCell, PSCell, and/or SCell.

Figure 4:
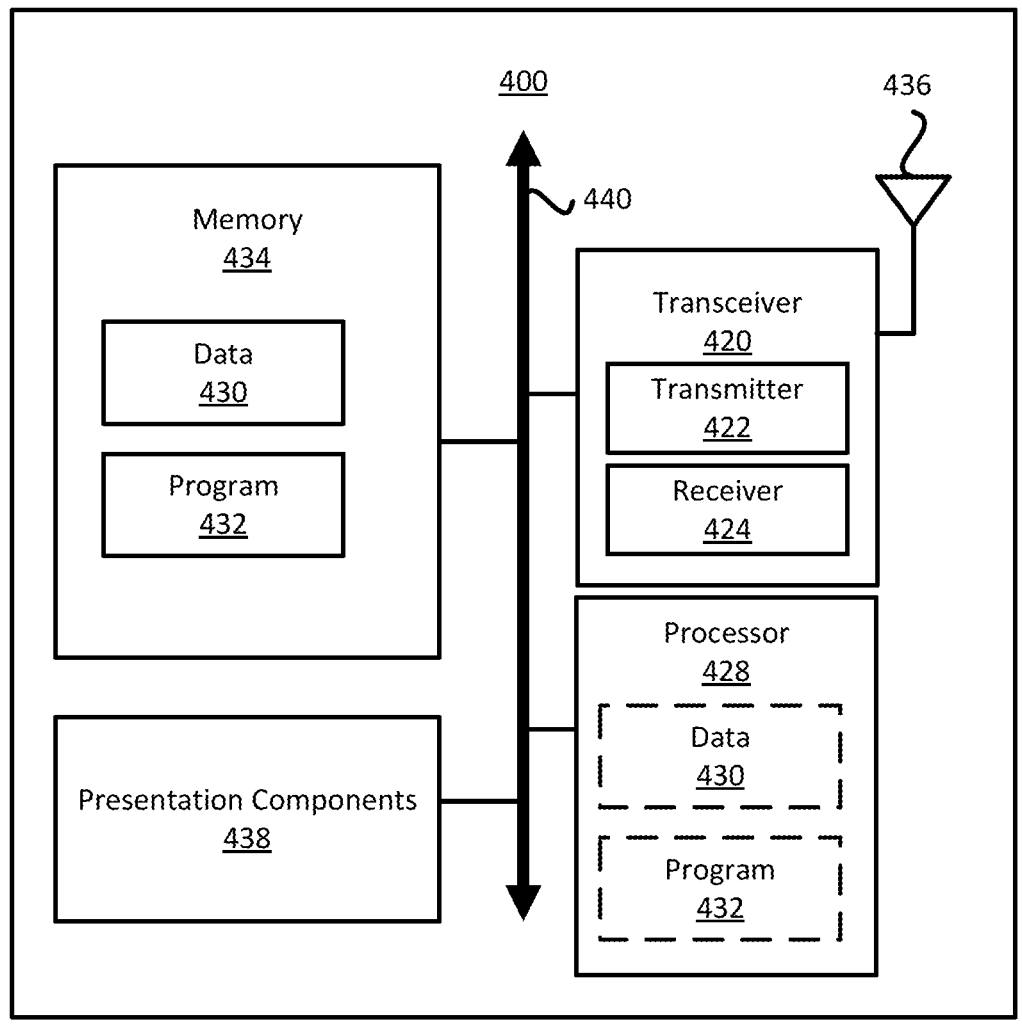
FIG. 4 is a block diagram illustrating a node for wireless communication in accordance with various aspects of the present disclosure.

FIG. 4 is a block diagram illustrating a node 400 for wireless communication in accordance with various aspects of the present disclosure. As illustrated in FIG. 4, a node 400 may include a transceiver 420, a processor 428, a memory 434, one or more presentation components 438, and at least one antenna 436. The node 400 may also include a radio frequency (RF) spectrum band module, a BS communications module, a network communications module, and a system communications management module, Input/Output (I/O) ports, I/O components, and a power supply (not illustrated in FIG. 4).

Each of the components may directly or indirectly communicate with each other over one or more buses 440. The node 400 may be a UE or a BS that performs various functions disclosed with reference to FIGS. 1 through 3.

The transceiver 420 has a transmitter 422 (e.g., transmitting/transmission circuitry) and a receiver 424 (e.g., receiving/reception circuitry) and may be configured to transmit and/or receive time and/or frequency resource partitioning information. The transceiver 420 may be configured to transmit in different types of subframes and slots including but not limited to usable, non-usable, and flexibly usable subframes and slot formats. The transceiver 420 may be configured to receive data and control channels.

The node 400 may include a variety of computer-readable media. Computer-readable media may be any available media that may be accessed by the node 400 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave or other transport mechanisms, and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the previously listed components should also be included within the scope of computer-readable media.

The memory 434 may include computer-storage media in the form of volatile and/or non-volatile memory. The memory 434 may be removable, non-removable, or a combination thereof. Example memory may include solid-state memory, hard drives, optical-disc drives, etc. As illustrated in FIG. 4, the memory 434 may store a computer-readable and/or computer-executable program 432 (e.g., software codes) that are configured to, when executed, cause the processor 428 to perform various functions disclosed herein, for example, with reference to FIGS. 1 through 3. Alternatively, the program 432 may not be directly executable by the processor 428 but may be configured to cause the node 400 (e.g., when compiled and executed) to perform various functions disclosed herein.

The processor 428 (e.g., having processing circuitry) may include an intelligent hardware device, e.g., a Central Processing Unit (CPU), a microcontroller, an ASIC, etc. The processor 428 may include memory. The processor 428 may process the data 430 and the program 432 received from the memory 434, and information transmitted and received via the transceiver 420, the baseband communications module, and/or the network communications module. The processor 428 may also process information to send to the transceiver 420 for transmission via the antenna 436 to the network communications module for transmission to a CN.

One or more presentation components 438 may present data indications to a person or another device. Examples of presentation components 438 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A wireless communication method for performing, by a User Equipment (UE), transmissions in a Radio Resource Control (RRC)_INACTIVE state, the wireless communication method comprising:
    receiving, in an RRC_CONNECTED state, an RRC release message including first information and second information, the first information including at least one Logical Channel Prioritization (LCP) mapping restriction, and the second information including one or more Configured Grant (CG) configurations;
    transitioning from the RRC_CONNECTED state to the RRC_INACTIVE state in response to receiving the RRC release message;
    determining, after transitioning to the RRC_INACTIVE state, that data from a Logical Channel (LCH) corresponding to the at least one LCP mapping restriction has become available for Uplink (UL) transmission;
    determining whether to transmit the data in the RRC_INACTIVE state based on whether any of the one or more CG configurations addresses the at least one LCP mapping restriction;
    in a case that a CG configuration of the one or more CG configurations addresses the at least one LCP mapping restriction, transmitting the data through a set of Physical Uplink Shared Channels (PUSCHs) determined by the CG configuration of the one or more CG configurations; and
    in a case that none of the one or more CG configurations addresses the at least one LCP mapping restriction, prohibiting the UE from transmitting the data, using the one or more CG configurations, in the RRC_INACTIVE state.

2. The wireless communication method according to claim 1, further comprising:
    releasing, after transitioning to the RRC_INACTIVE state, the at least one LCP mapping restriction and at least part of the one or more CG configurations in a case that:
        the UE determines that UL transmission is no longer needed to be performed in the RRC_INACTIVE state,
        the UE has moved outside of a coverage area of a serving cell,
        the UE is not synchronized with the serving cell, or
        the UE receives, from the serving cell, a release indicator in system information.

3. The wireless communication method according to claim 1, further comprising:
    releasing, after transitioning to the RRC_INACTIVE state, all of the at least one LCP mapping restriction and all of the one or more CG configurations in a case that the UE has moved outside of a coverage area of a serving cell.

4. The wireless communication method according to claim 1, further comprising:
    releasing, after transitioning to the RRC_INACTIVE state, all of the at least one LCP mapping restriction and all of the one or more CG configurations in a case that the UE is not synchronized with a serving cell.

5. The wireless communication method according to claim 1, further comprising:
    releasing, after transitioning to the RRC_INACTIVE state, all of the one or more CG configurations in a case that the UE receives, from a serving cell, a release indicator in system information.

6. The wireless communication method according to claim 1, wherein the first information includes at least one of:
    an allowed CG list that at least indicates the CG configuration of the one or more CG configurations, or
    a parameter denoted as configuredGrantType1Allowed.

7. A User Equipment (UE) for performing transmissions in a Radio Resource Control (RRC)_INACTIVE state, the UE comprising:
    a receiver;
    a transmitter;
    at least one processor coupled to the receiver and the transmitter; and
    at least one non-transitory machine-readable medium coupled to the at least one processor and storing one or more one computer-executable instructions that, when executed by the at least one processor, cause the UE to:
        receive, in an RRC_CONNECTED state, by the receiver, an RRC release message including first information and second information, the first information including at least one Logical Channel Prioritization (LCP) mapping restriction, and the second information including one or more Configured Grant (CG) configurations;
        transition from the RRC_CONNECTED state to the RRC_INACTIVE state in response to receiving the RRC release message;
        determine, after transitioning to the RRC_INACTIVE state, that data from a Logical Channel (LCH) corresponding to the at least one LCP mapping restriction has become available for Uplink (UL) transmission;
        determine whether to transmit the data in the RRC_INACTIVE state according to based on whether any of the one or more CG configurations addresses the at least one LCP mapping restriction;

in a case that a CG configuration of the one or more CG configurations addresses the at least one LCP mapping restriction, transmit, by the transmitter, the data through a set of Physical Uplink Shared Channels (PUSCHs) determined by the CG configuration of the one or more CG configurations; and in a case that none of the one or more CG configurations addresses the at least one LCP mapping restriction, prohibit the UE from transmitting the data, using the one or more CG configurations, in the RRC_INACTIVE state.

8. The UE according to claim 7, wherein the one or more computer-executable instructions, when executed by the at least one processor, further cause the UE to:

release, after transitioning to the RRC_INACTIVE state, the at least one LCP mapping restriction and at least part of the one or more CG configurations in a case that:
the UE determines that UL transmission is no longer needed to be performed in the RRC_INACTIVE state,
the UE has moved outside of a coverage area of a serving cell,
the UE is not synchronized with the serving cell, or
the UE receives, from the serving cell, a release indicator in system information.

9. The UE according to claim 7, wherein the or more computer-executable instructions, when executed by the at least one processor, further cause the UE to:

release, after transitioning to the RRC_INACTIVE state, all of the at least one LCP mapping restriction and all of the one or more CG configurations in a case that the UE has moved outside of a coverage area of a serving cell.

10. The UE according to claim 7, wherein the one or more computer-executable instructions, when executed by the at least one processor, further cause the UE to:

release, after transitioning to the RRC_INACTIVE state, all of the at least one LCP mapping restriction and all of the one or more CG configurations in a case that the UE is not synchronized with a serving cell.

11. The UE according to claim 7, wherein the one or more computer-executable instructions, when executed by the at least one processor, further cause the UE to:

release, after transitioning to the RRC_INACTIVE state, all of the one or more CG configurations in a case that the UE receives, from a serving cell, a release indicator in system information.

12. The UE according to claim 7, wherein the first information includes at least one of:

an allowed CG list that at least indicates the CG configuration of the one or more CG configurations, or a parameter denoted as configuredGrantType1Allowed.

* * * * *